US012217577B2

(12) United States Patent
Sullivan et al.

(10) Patent No.: US 12,217,577 B2
(45) Date of Patent: Feb. 4, 2025

(54) AUTOMATED FEEDER SYSTEM AND METHODS OF USE

(71) Applicant: Jackpocket LLC, New York, NY (US)

(72) Inventors: Peter J. Sullivan, Santa Barbara, CA (US); Eric Parker, Brooklyn, NY (US); Thompson Bertron, Austin, TX (US); Anna D Cardinal, Austin, TX (US); Redza Shah, Austin, TX (US); Drew Eric Walther, Yukon, OK (US); Jason Dye, Austin, TX (US); Frank Zeiler, Austin, TX (US)

(73) Assignee: Jackpocket LLC, New York, NY (US)

( * ) Notice: Subject to any disclaimer, the term of this patent is extended or adjusted under 35 U.S.C. 154(b) by 0 days.

(21) Appl. No.: 18/472,889

(22) Filed: Sep. 22, 2023

(65) Prior Publication Data

US 2024/0013632 A1    Jan. 11, 2024

Related U.S. Application Data

(63) Continuation of application No. 17/939,122, filed on Sep. 7, 2022, now Pat. No. 11,804,108, which is a continuation of application No. 17/717,440, filed on Apr. 11, 2022, now Pat. No. 11,495,096.

(60) Provisional application No. 63/173,680, filed on Apr. 12, 2021.

(51) Int. Cl.
*G07F 17/42* (2006.01)
(52) U.S. Cl.
CPC .................... *G07F 17/42* (2013.01)
(58) Field of Classification Search
CPC ...... G07F 17/42; G07F 17/329; G06Q 20/045
See application file for complete search history.

(56) References Cited

U.S. PATENT DOCUMENTS

| 4,897,687 A | 1/1990 | Wise | |
|---|---|---|---|
| 2012/0214582 A1 * | 8/2012 | Marek | A63F 3/0645 463/17 |

FOREIGN PATENT DOCUMENTS

| AU | 2004201086 A1 * | 10/2004 | |
|---|---|---|---|
| CN | 1290751 C * | 12/2006 | |
| CN | 101025603 B * | 11/2011 | G03G 21/02 |

(Continued)

OTHER PUBLICATIONS

International Search Report and Written Opinion in corresponding Application No. PCT/US2022/024269, dated Jul. 4, 2022, (53 pages).

*Primary Examiner* — Thien M Le
*Assistant Examiner* — Tae W Kim
(74) *Attorney, Agent, or Firm* — Bookoff McAndrews, PLLC

(57) ABSTRACT

An automatic feeder system may include: an input bin configured to store at least one physical request slip; a feeder unit; and a support frame. The feeder unit may include a feed neck operable to automatically obtain a physical request slip from the input bin and convey it out from an outlet of the feed neck. The support frame may support the feeder unit so that the outlet is configured to engage with an input of a retailer system engaged with the automatic feeder system such that conveyance of the physical request slip out from the outlet causes the physical request slip to enter the input of the retailer system and cause the retailer system to generate a physical ticket for the game of chance based on the physical request slip.

19 Claims, 44 Drawing Sheets

(56) References Cited

FOREIGN PATENT DOCUMENTS

| | | | | | |
|---|---|---|---|---|---|
| CN | 202257717 | U | * | 5/2012 | |
| CN | 110525056 | A | * | 12/2019 | .............. B41J 29/38 |
| CN | 110525056 | U | | 12/2019 | |
| JP | H03120128 | A | | 5/1991 | |
| JP | H11314783 | A | | 11/1999 | |
| JP | 4023242 | B2 | * | 12/2007 | |
| KR | 102134560 | B1 | * | 7/2020 | |
| WO | WO-9217856 | A1 | * | 10/1992 | .............. G07F 17/42 |

\* cited by examiner

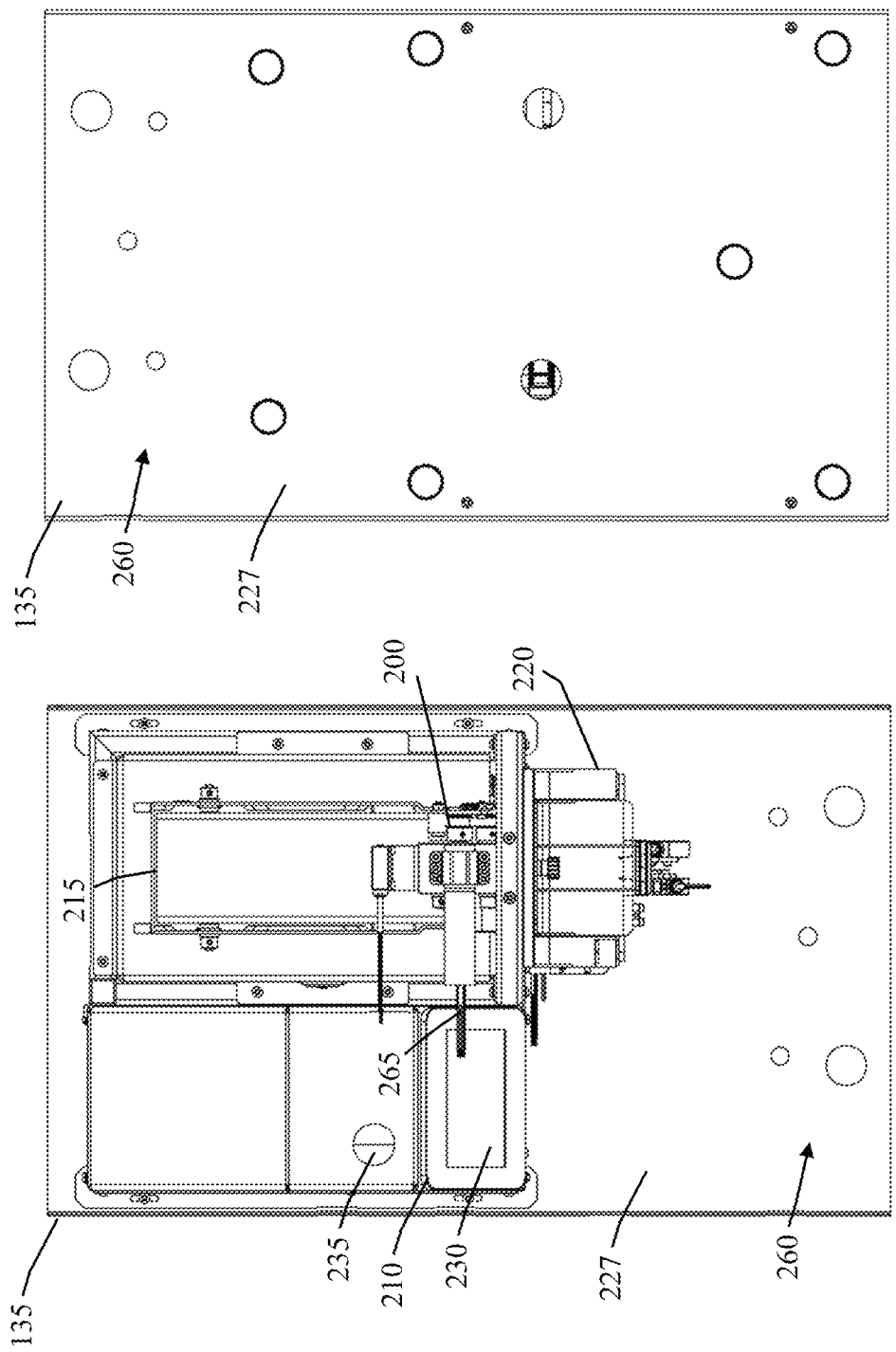

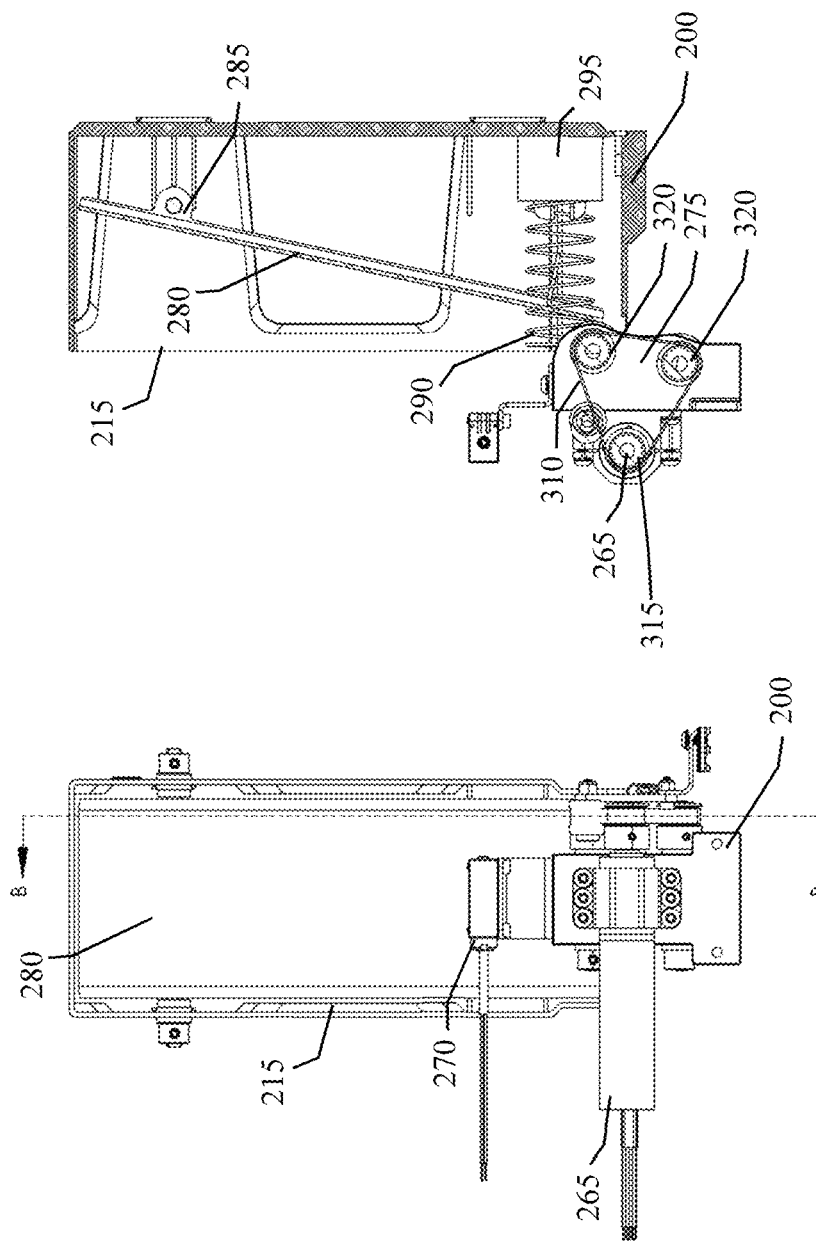

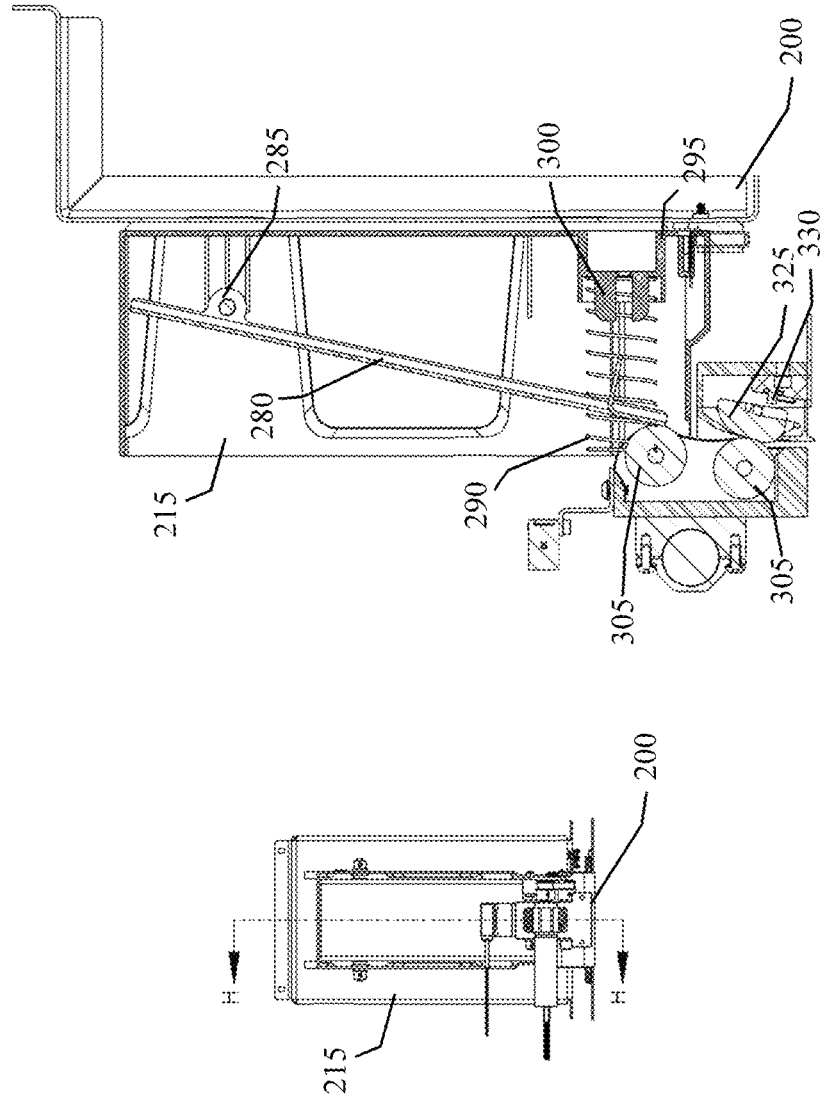

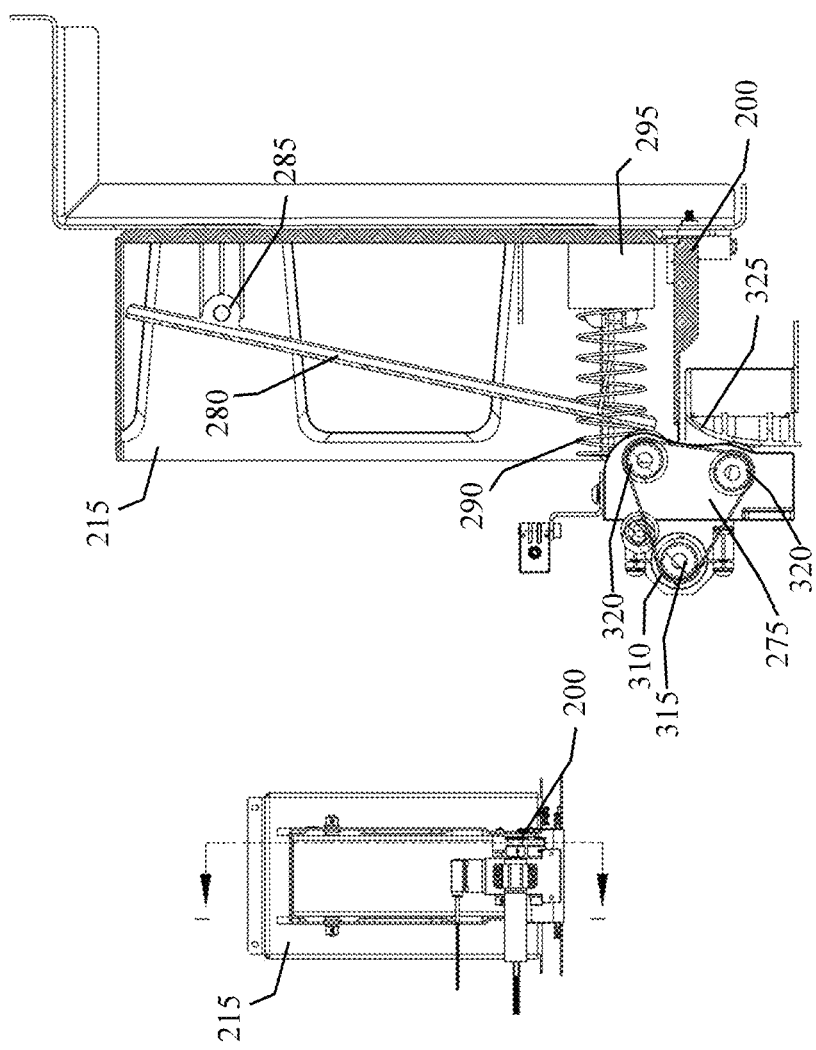

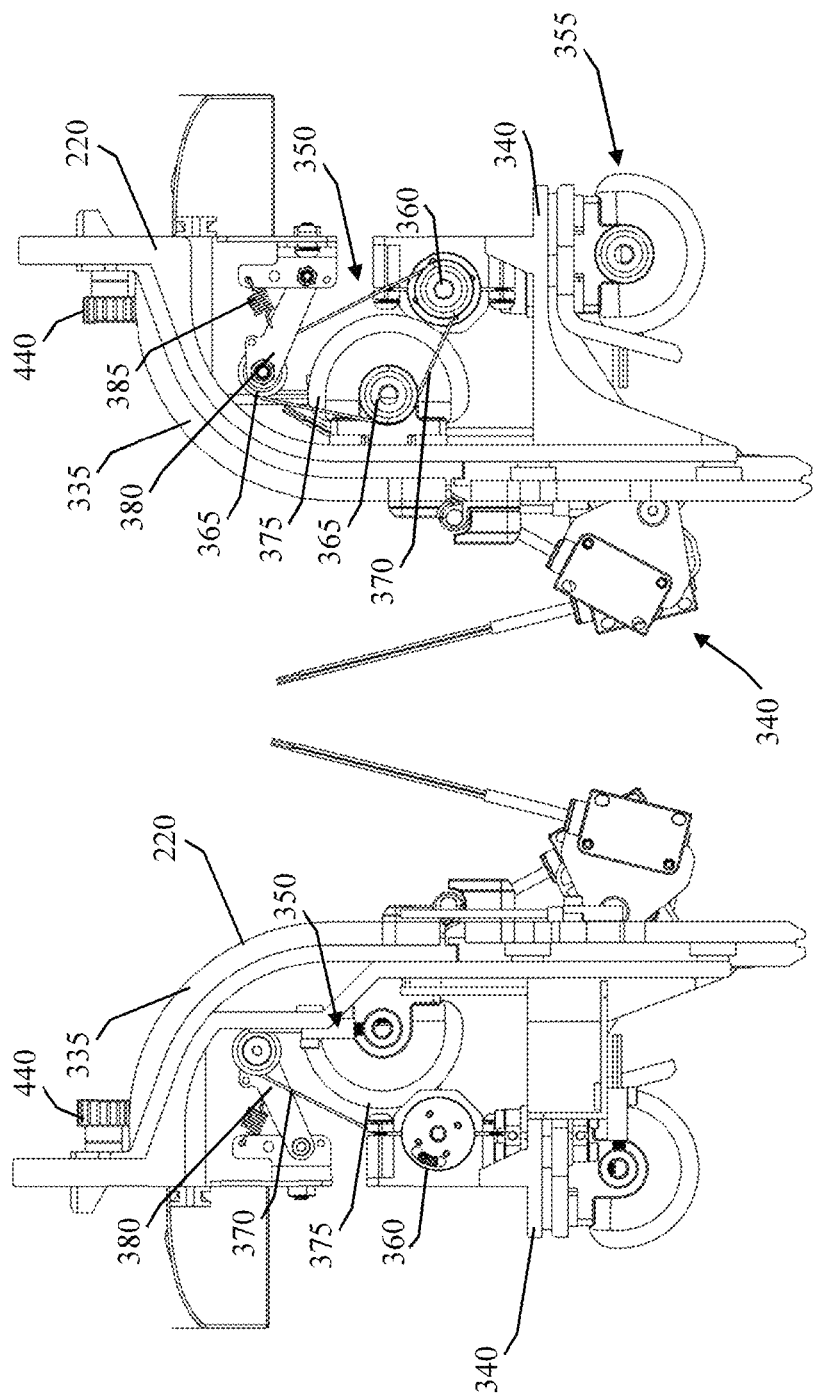

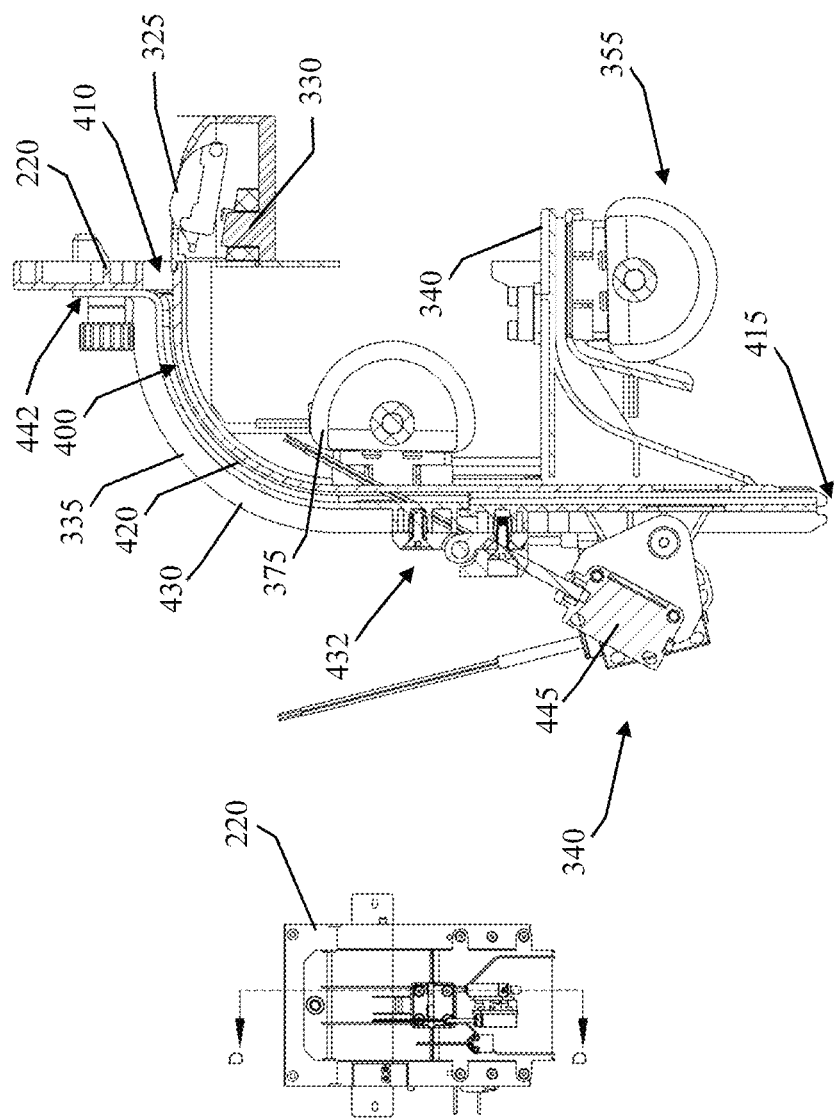

AUTOMATED FEEDER SYSTEM AND METHODS OF USE

RELATED APPLICATIONS

This application is a continuation of and claims the benefit of priority to U.S. patent application Ser. No. 17/939,122, filed on Sep. 7, 2022, which is continuation of and claims the benefit of priority to U.S. patent application Ser. No. 17/717,440, filed on Apr. 11, 2022, now U.S. Pat. No. 11,495,096 issued Nov. 8, 2022, which claims the benefit of U.S. 63/173,680, filed on Apr. 12, 2021, entitled "AUTOMATIC FEEDER SYSTEM AND METHODS OF USE," the entireties of which are incorporated herein.

TECHNICAL FIELD

Various embodiments of the present disclosure relate generally systems and methods for integrating physical documents into electronic activities, and more particularly to a system for automatically feeding documents to another device and methods of using the same.

BACKGROUND

Widespread implementation of communications technologies such as the internet have led to numerous activities transitioning partially or entirely from physical implementations to electronic. However, the transition to electronic media is impractical, impermissible, and/or impossible for at least portions of some activities. For example, in some instances, a convention, regulation, or law may prefer or require that a certain activity is associated with a physical document, e.g., as a record, deed, contract, writ, note, or the like. As a result, some activities may not fully benefit from the increases in efficiency, speed, accessibility, and the like that may arise from conversion to an electric medium.

In an exemplary case, many jurisdictions have regulations that require a lottery to associate a physical ticket with each entry. Such requirements, and/or others such as a prohibition on online gambling, or the like, may limit an extent to which lotteries and other games of chance may innovate and leverage advances in technology, such as the internet and widespread adoption of communications technologies like mobile smart devices.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one aspect, an automatic feeder system for automatically causing a retailer system to generate at least one physical ticket for a game of chance using a physical request slip, the automatic feeder system may include: an input bin configured to store at least one physical request slip; a feeder unit that includes a feed neck, and that is operable to automatically obtain the at least one physical request slip from the input bin and convey the at least one physical request slip out from an outlet of the feed neck; and a support frame that supports the feeder unit so that outlet of the feed neck is configured to engage with a physical request slip input of a retailer system engaged with the automatic feeder system such that conveyance of the at least one physical request slip out from the outlet of the feed neck causes the at least one physical request slip to enter the physical request slip input of the retailer system and cause the retailer system to generate the at least one physical ticket for the game of chance based on the at least one physical request slip.

In another aspect, a method of operating an automatic feeder system to automatically cause a retailer system to generate at least one physical ticket for a game of chance using a physical request slip may include: receiving, at an input bin of the automatic feeder system, at least one physical request slip; engaging a retailer system with the automatic feeder system, wherein the automatic feeder system includes feed unit that includes a feed neck and that is supported by a support frame such that an outlet of the feed neck is engaged with a physical request slip input of the retailer system; and operating the feeder unit automatically obtain the at least one physical request slip from the input bin and convey the at least one physical request slip out from an outlet of a feed neck of the feeder unit and into the physical request slip input of the retailer system, such that the retailer system is caused to generate the at least one physical ticket for a game of chance based on the at least one physical request slip.

In a further aspect, a non-transitory computer-readable medium comprising instructions that are executable by at least one processor of a control system for an automatic feeder system to perform operations, including: operating a feeder unit of the automatic feeder system to automatically obtain at least one physical request slip from an input bin of the automatic feeder system and conveying the at least one physical request slip out from an outlet of a feed neck of the feeder unit and into a physical request slip input of a retailer system, such that the retailer system is caused to generate at least one physical ticket for a game of chance based on the at least one physical request slip.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4-10 depict perspective, rear, front, left, right, top, and bottom views, respectively, of an exemplary embodiment of an automatic feeder system, according to one or more embodiments.

FIG. 21 depicts a top view of an exemplary embodiment of a feed belt assembly from an automatic feeder system, according to one or more embodiments.

FIG. 22 depicts a cross-section view of the feed belt assembly from FIG. 21.

FIG. 23 depicts a top view of an exemplary embodiment of a feeder unit assembly from an automatic feeder system, according to one or more embodiments.

FIG. 24 depicts a cross-section view of the feeder unit from FIG. 23.

FIG. 25 depicts a top view of an exemplary embodiment of a feed belt assembly and feed element from an automatic feeder system, according to one or more embodiments.

FIG. 26 depicts a cross-section view of the feed belt assembly and feed element from FIG. 25.

FIGS. 32-37 depict isometric, left, right, top, bottom, and front views, respectively, of an exemplary embodiment of a feed neck of an automatic feeder system, according to one or more embodiments.

FIG. 38 depicts a cross-section view of the feed neck of FIG. 37.

FIG. 39 depicts a front view of another exemplary embodiment of a feed neck of an automatic feeder system, according to one or more embodiments.

FIG. 40 depicts a cross-section view of the feed neck of FIG. 39.

DETAILED DESCRIPTION OF EMBODIMENTS

Figure 1:
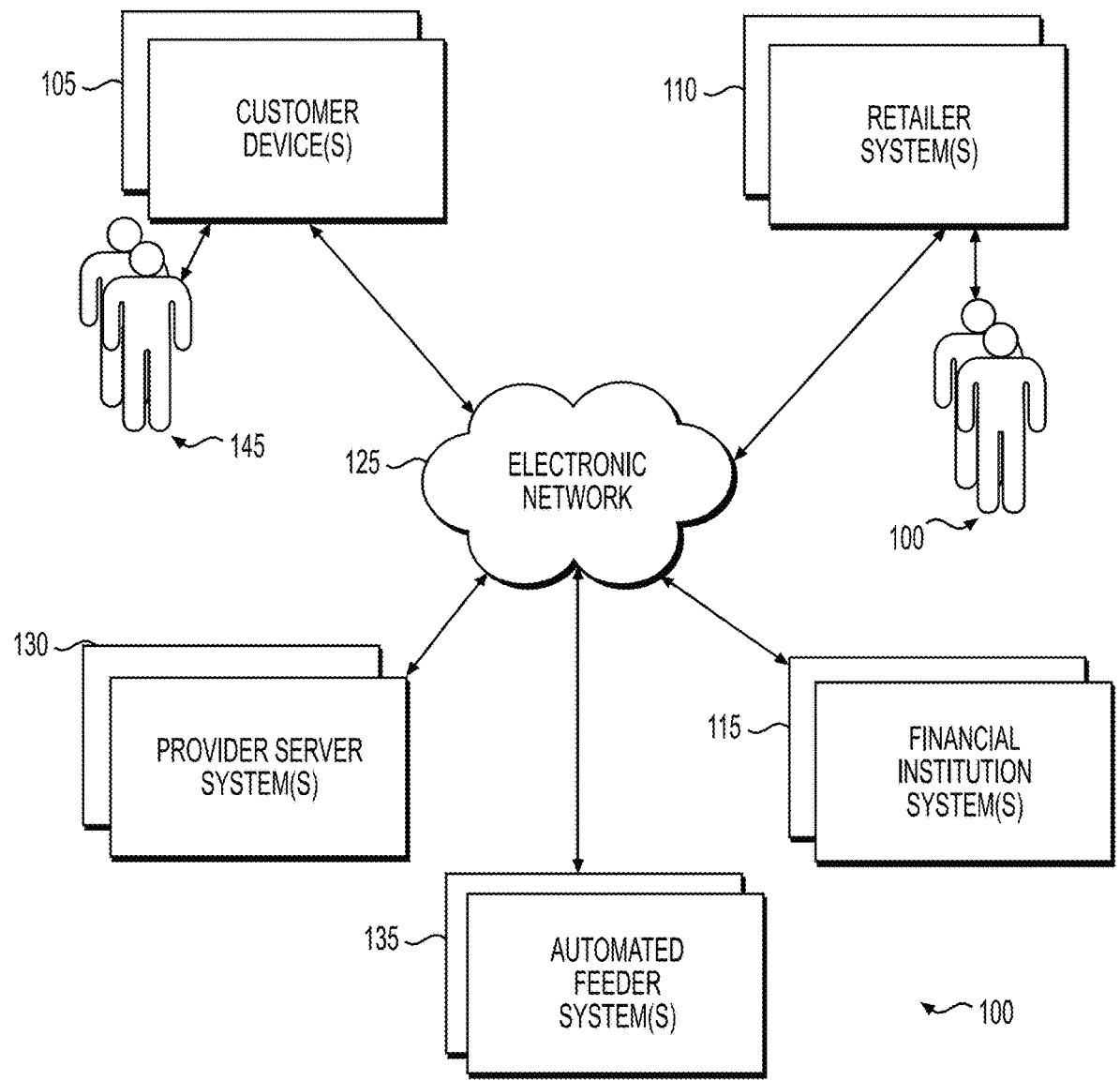
FIG. 1 depicts an exemplary computing environment for operating a game of chance, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Terms like "retailer," "merchant," "vendor," "seller," or the like generally encompass a person and/or entity that may be involved in the providing and/or sale of goods or services, and in particular of entries into an activity such as a game of chance. A "game of chance" generally encompasses an activity where a participant, e.g., a customer, player, or the like, must pay for a chance at winning, e.g., a wager, ticket, entry, or the like. The term "provider" generally encompasses a person and/or entity that facilitates, runs, services, supports, licenses, or oversees an activity, e.g., a game of chance. A provider may provide, for example, one or more of a retailer with entries (e.g., lottery tickets), means to provide entries to customers (e.g., a ticket printer, terminal, etc.), funds and/or prizes to distribute to winners, either directly or indirectly, or the like. It should be understood that, in some circumstances, a retailer may be incorporated into or act as an intermediary for a provider.

An entity may desire to provide, operate, and/or execute an activity via an electronic medium, whereby the activity is associated with a physical document. For example, a provider may desire to offer a game of chance that may be played electronically and/or remotely (e.g., by using a computing device such a mobile phone). However, technical limitations, regulations, or the like may inhibit the implementation of the activity in an electric medium. For instance, the requirement for a physical ticket for each entry in a game of chance may impose limitations on the operations of games of chance via electronic interaction. Accordingly, improvements in technology relating to providing an activity associated with a physical document, such as a game of chance, is needed.

In the following description, embodiments will be described with reference to the accompanying drawings. As will be discussed in more detail below, in various embodiments, systems and methods for enabling electronic interaction with activities associated with a physical document are described. Although several examples and embodiments below pertain to providing games of chance, it should be understood that the techniques and technologies disclosed herein may be adapted to any suitable activity associated with a physical document. For example, the techniques and technologies disclosed herein may be adapted to physical ballots for an election, physical citations for legal code enforcement, physical tickets for a concert or event, etc.

In an exemplary use case, a customer may desire to play a game of chance. The customer may access an electronic application associated with the game of chance, e.g., via a customer device. The customer may submit a request to purchase one or more entries into the game of chance. The electronic application may submit the request to a provider server system. The provider server system may generate ticket information based on the request, and cause a printer system and/or an automatic feeder system associated with the provider to print a physical request slip based on the ticket information. The automatic feeder system may submit the physical request slip to a retailer system, e.g., via a mechanical interface. The retailer system may submit the information from the request slip to the provider server system, and the provider server system may transmit one or more wagers corresponding to the one or more purchased entries to the retailer system. The retailer system may generate a physical ticket corresponding to the one or more purchased entries. A scanner device may obtain information from the physical ticket (e.g., the one or more wagers), e.g., individually or in batches of physical tickets, and may provide the information to the provider system or another system. The provider system may associate the physical ticket with the request from the customer and/or the request slip, and/or may transmit information regarding the one or more wagers to the customer, e.g., via the electronic application of the customer device.

Once the game of chance has concluded, the customer may validate the one or more entries via the electronic application, whereby the customer may receive winnings based on the position(s) of the one or more entries (e.g., via an electronic transfer to an account of the customer via a financial institution associated with the customer, the provider, and/or the retailer). The provider server system may record the one or more purchased entries as validated and/or redeemed, such that subsequent attempts to validate the one or more purchased entries, e.g. via the physical ticket, are rejected.

In another exemplary use case, an automatic feeder system may receive a request, associated with a customer, for one or more entries into a game of chance. The request may be received from a provider server system, a retailer server system, a customer device associated with the customer, or the like, or combinations thereof. In response to receiving the request, the automatic feeder system may generate request slip data based on the received request. The request slip data may map information from the request to one or more selection or entry of a physical request slip. The automatic feeder system and/or a printer system may generate, e.g., print, a physical request slip based on the generated request slip data.

In some instances, the automatic feeder system includes or is associated with one or more printer systems and one or more feeder units. In some instances, physical request slips printed by the one or more printer systems are automatically conveyed to the one or more feeder units. In some instances, printed physical request slips are collected, e.g., mechanically and/or manually, and are submitted to the one or more feed units, e.g., to an input bin of the feeder unit(s). A feeder unit may include a feed neck configured to convey and submit a physical request slip printed by the automatic feeder to a retailer system.

The retailer system may generate a physical ticket for the game of chance. The scanner device, or the like, may capture information from the physical ticket and provide such information to one or more of the customer device, the provider server system, or the like. The provider server system may be configured to track and record requests that are fulfilled, e.g., in the manner discussed above.

In some instances, the generation of the physical ticket by the retailer system may be unsuccessful, e.g., due to a jam in the conveyance of a physical request slip, an error in capturing information from the physical request slip, an error in the information of the physical request slip, a fault in the automatic feeder system or the retailer system, or the like. In some instances, the retailer system may be configured to reject submission of a physical request slip in response to an unsuccessful physical ticket generation, e.g., expel the request slip back out from an input of the retailer system.

In some instances, the automatic feeder system is configured to detect a rejection of a physical request slip, e.g., via one or more sensors. In some instances, the feed neck includes an access, e.g., a hinged opening, a removable section, or the like, configured to provide access to an inside of the feed neck in order to remove a rejected and/or jammed physical request slip. In some instances, the hinged opening includes a magnetic fastener that, for example, enables access in order to rapidly address a jam or issue.

In some instances, the automatic feeder system is configured to accept rejected physical requests slips from the retailer system. For instance, the feed neck of the automatic feeder system may include a first path for conveying a physical request slip to the retailer system, and a second path for receiving a rejected physical request slip from the retailer system. In some instances, the second path branches off from the first path such that a rejected physical request slip entering the feed neck is guided along the second path. In some instances, the second path leads to a rejected slip storage unit. In some instances, rejected physical request slips may be one or more of resubmitted to the retailer system, re-generated, flagged for manual processing, manually processed, or the like.

In some instances, the automatic feeder system includes a control system and one or more actuating devices, e.g., rollers, belts, graspers, cams, or the like that are configured to control and guide conveyance of a physical request slip. In some instances, the control system is configured to control a rate at which physical request slips are submitted, an interval between submissions, or the like.

FIG. 1 depicts an exemplary computing environment 100 that may be utilized with techniques presented herein. One or more customer device(s) 105, one or more retailer system(s) 110, and/or one or more financial institution system(s) 115, may communicate across an electronic network 125. As will be discussed in further detail below, one or more provider server system(s) 130, one or more printer systems 133, and one or more automatic feeder system(s) 135 may communicate with each other and/or one or more of the other components of the computing environment 100. Each customer device 105 may be associated with a respective customer 145. Each retailer system 110 may be associated with a respective retailer 150.

The systems and devices of the computing environment 100 may communicate in any arrangement. As will be discussed herein, systems and/or devices of the computing environment 100 may communicate in order to, for example, operate a game of chance in a manner that provides electronic interaction in association with physical tickets for the game of chance. Further, it should be understood that the techniques and technologies discussed herein may be adopted to any suitable activity associated with a physical document.

The customer device 105 may be a computer system such as, for example, a desktop computer, a mobile device, etc. In an exemplary embodiment, the customer device 105 is a cellphone, or the like. In some embodiments, the customer device 105 may include one or more electronic application(s), e.g., a program, plugin, etc., installed on a memory of the customer device 105. In some embodiments, the electronic application(s) may be associated with one or more of the other components in the computing environment 100. For example, the electronic application(s) may include customer authentication tools, a digital wallet of the customer, an application that provides access to an online portal, website, or the like for a game of chance hosted by the provider server system 130, or the like.

In some embodiments, a retailer 150 may be associated with a plurality of retailer system 110. In some embodiments, the retailer system 110 may include a game terminal machine, or the like. A game terminal machine generally encompasses a computer system associated with a game of chance and configured to facilitate and/or execute purchases of entries into the game of chance. In some embodiments, the game terminal machine may include a printing mechanism operable to print a physical ticket corresponding to a request for an entry into the game of chance. In some embodiments, the game terminal machine may include at least one sensor configured to capture request information, e.g., from a physical request slip, and the game terminal machine may be configured to obtain and/or output, e.g., print, a physical ticket based on the request information included on a received request slip. The game terminal machine may be configured to parse information from a captured image. For example, the game terminal machine may employ a text recognition algorithm, an image recognition algorithm, a bubble-form reader (e.g., a Scantron™ reader), or the like to parse information captured from a received request slip.

A financial institution system 115 may include, for example, a computer system associated with one or more of a banking institution, a credit card institution, or the like. The financial institution system 115 may include financial data related to one or more of the customer 145, the retailer 150, the provider, or the like. The financial institution system 115 may be configured to facilitate and/or execute financial transactions by and/or between one or more persons and/or entities utilizing the computing environment. Financial data may include, for example, account information, authentication information, transaction information, or the like.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

As discussed in further detail below, the provider server system 130 may be configured to one or more of provide and/or host an activity such as a game of chance, facilitate and/or execute requests and/or purchases for the activity such as entries into the game of chance, facilitate and/or execute transactions associated with activity such as transferring funds to and from the customer 145, the retailer 150, the provider, etc., or the like. The provider server system 130 may include data regarding associations between one or more aspects that may be included in a request for an entry into a game of chance and corresponding information on a physical request slip for the entry. For example, in some embodiments, the provider server system 130 includes a mapping of aspects of a request to information on a physical request slip.

The provider system 130 may include an electronic application, a portal, a webpage, or the like that facilitates one or more of purchasing entries for the game of chance, monitoring a position of an entry, validating a position of an entry for a concluded game of chance, transferring funds between one or more of the customer 145, retailer 150, provider, etc., e.g., via the financial institution system 115, or the like. The provider server system 130 may include instructions and/or rules operable to execute the hosting of the game of chance.

The printer system 133 may be operable, e.g., by the provider server system 130 to print a physical request slip based on a request for one or more entries. For example, the printer system 133 may be configured to receive entry request information, e.g., from the customer device 105, the retailer system 110, and/or the provider server system 130. The printer system 133 may be configured to print a physical request slip based on received request information. In some embodiments, the printer system 133 may be configured to automatically convey a printed physical request slip to the automatic feeder system 135. In some embodiments, a person and/or another device may assist in conveying physical request slips printed by the printer system 133 to the automatic feeder system 135.

The automatic feeder system 135 may be configured to convey and submit physical request slips to the retailer system 110. In some embodiments, the automatic feeder system 135 and/or another system may include one or more sensors configured to capture ticket information from one or more of a conveyed request slip or a physical ticket output by the retailer system 110 in response to a request slip, as discussed in further detail below. For example, the automatic feeder system 135 and/or the other device may include a scanner, camera, reader, or the like.

The automatic feeder system 135 and/or the provider server system 130 may be configured to parse information captured from the physical ticket, e.g., via a scanner device, and/or transmit information captured from the physical ticket to the provider server system 130, the customer device 105, or the like. The association between an entry, e.g., a request, and a wager which may be stored by the provider server system 130, for example as discussed above, may be based on a relationship between a request slip and the information captured from a physical ticket output by the retailer system 110 in response to receiving the request slip. Various aspects of different embodiments of automatic feeder systems including one or more of the features above and/or others are discussed in further detail below.

Although depicted as separate components in FIG. 1, it should be understood that a component or portion of a component may, in some embodiments, be integrated with or incorporated into one or more other components. For example, a portion of the provider server system 130 may be provided to the customer device 105 as an electronic portal via the electronic application. At least a portion of provider server system 130 and/or the automatic feeder system 135 may be integrated into the retailer system 110, or vice versa. The printer system 133 may be integrated into the automatic feeder system 135 or vice versa. Any suitable arrangement of the various systems and devices of the computing environment 100 may be used.

Figure 2:
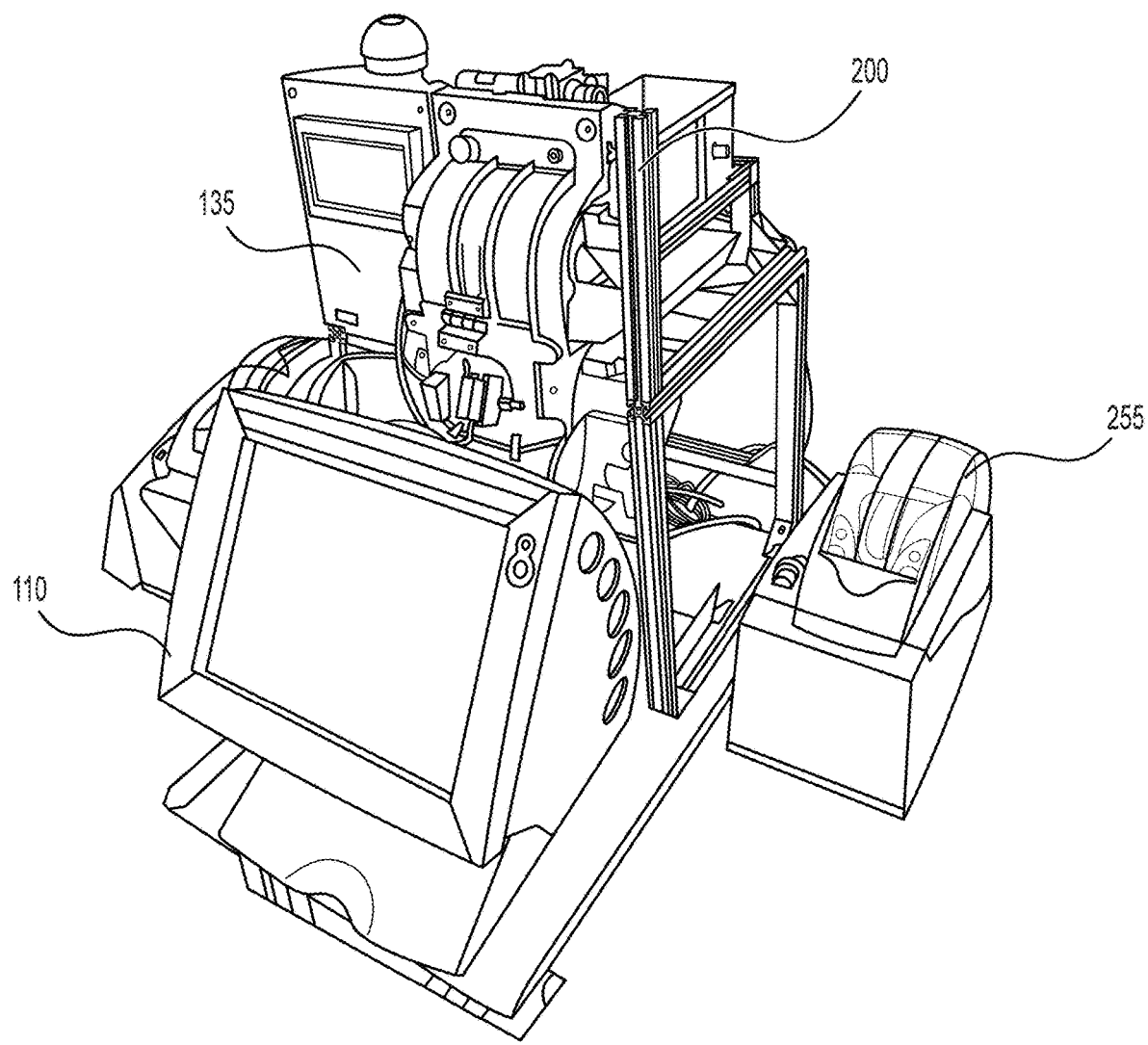
FIG. 2 depicts a perspective image of an exemplary embodiment of an automatic feeder system, according to one or more embodiments.

FIG. 2 depicts a perspective view of an exemplary embodiment of an automatic feeder system 135 engaged with a retailer system 110. The automatic feeder system 135 includes a feeder unit 200, a control system 210, an input bin 215, a rejection bin 217, a feed neck 220, a support frame 225, and a support plate 227. As discussed in further detail below, the retailer system 110, in some embodiments, may be mounted with the automatic feeder system 135 via the support frame 225 and/or support plate 227. As discussed in further detail below, in this embodiment, the printer system 133 is not configured to directly feed printed physical request slips into the input bin 215. However, other configurations, such as configurations in which the printer system 133 is configured to directly feed printed physical request slips into the input bin 215, are contemplated in other embodiments.

Figure 3:
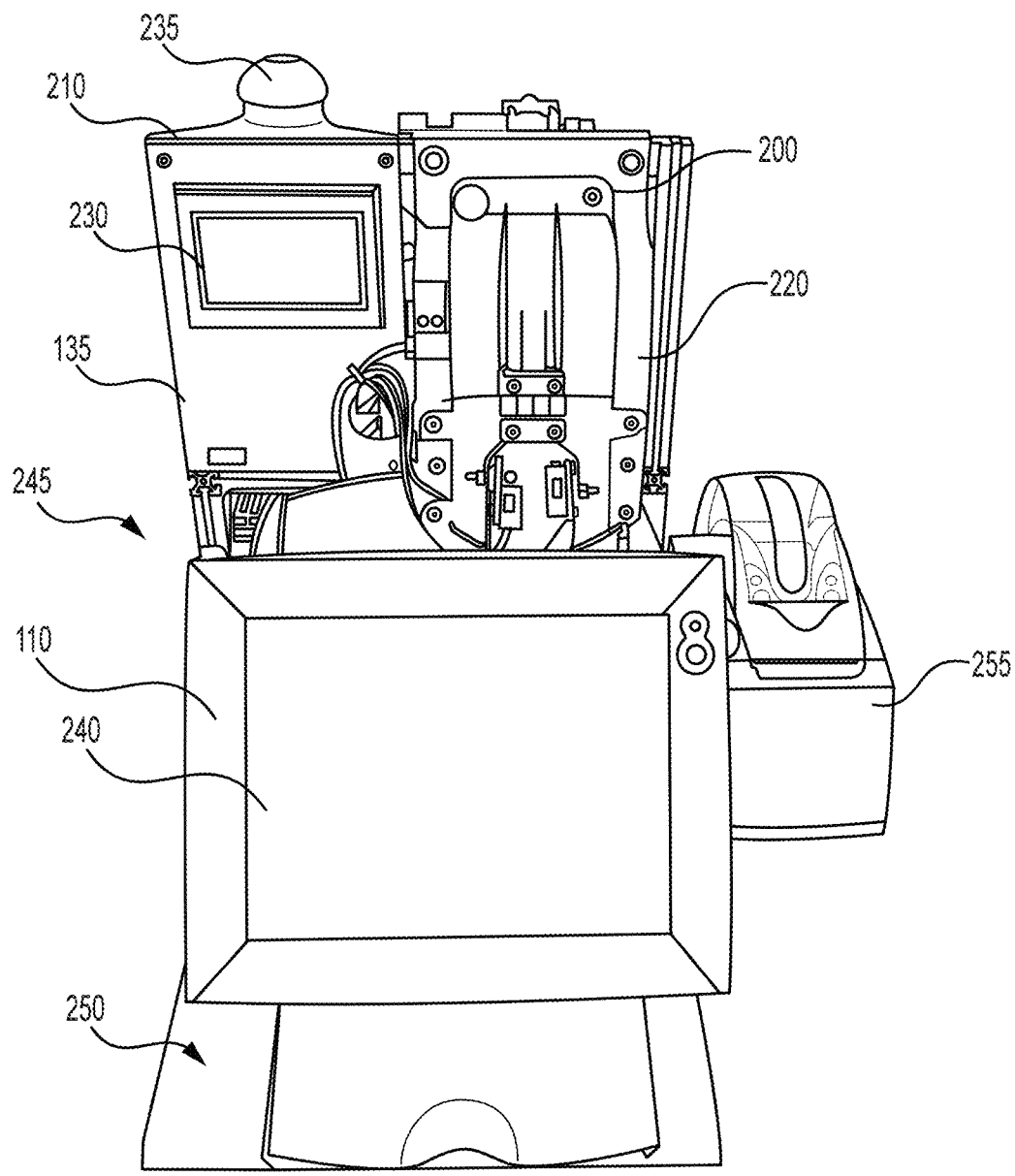
FIG. 3 depicts a front image of the automatic feeder system of FIG. 2.

FIG. 3 depicts a front view of the automatic feeder system 135 and retailer system 110 of FIG. 2. As shown in FIG. 3, the control system 210 includes an interface 230 and an indicator 235. The interface 230, in various embodiments, may include any suitable input device and/or output device for interacting with a user. For example, in this embodiment, the interface 230 includes a touch screen configured to receive a user touch interaction and to output control information. In some embodiments, the interface 230 may include one or more of a button, a keyboard, a switch, a toggle, a display, or the like. As discussed in further detail below, the interface 230 may be configured to receive input from the user to set and/or adjust control settings of the automatic feeder system 135, and to output settings and/or status of the automatic feeder system 135.

The indicator 235 may include any suitable device for providing a visual indication, e.g., a light source such as an LED, or the like. In some embodiments, the indicator 235 may be operable to produce various visual signals, e.g., of different colors, intensities, frequencies, patterns, etc. The control system 210 may be configured to operate the feeder unit 200, e.g., electronically and/or mechanically, as discussed in further detail below.

The retailer system 110 may include, for example, a retailer interface 240, a physical request slip input 245, a physical request slip output 250, and a ticket printer 255. The retailer interface 240 may be any suitable type of interface and, for example, may enable a user, e.g., a retailer 150, to direct and/or adjust operation of the retailer system 110, e.g., select a game of chance for the printing of tickets, retrieve information regarding printed tickets, etc. The retailer system 110 may be mounted so that the physical request slip input 245 is engaged with the feed neck 220 of the feeder unit 200. The retailer system 110 may be configured to scan, capture, parse, or the like, information from a received physical request slip.

In some embodiments, the retailer system 110 may be mounted so that the physical request slip output 250 is configured to convey physical request slips, e.g., that have been scanned by the retailer system 110, into a repository, bin, or the like. The retailer system 110 may be configured to operate the ticket printer 255 to print a physical ticket based on information from a received physical request slip. In some embodiments, the ticket printer 255 may be configured to convey printed physical tickets to a repository, bin, or the like. In some embodiments, the ticket printer 255 may be configured to convey printed physical tickets to a scanner, image capture device, or the like that may be configured to capture information from the physical ticket. In some embodiments, such conveyance may be manual, e.g., by a person.

Figure 4:
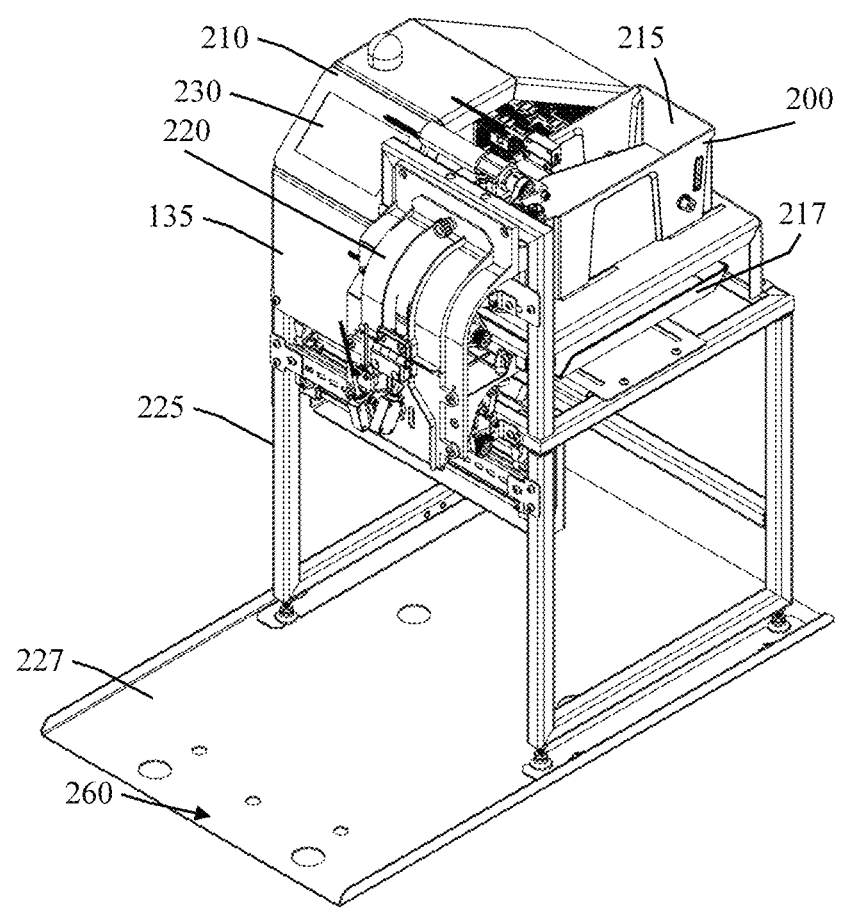
Figure 6:
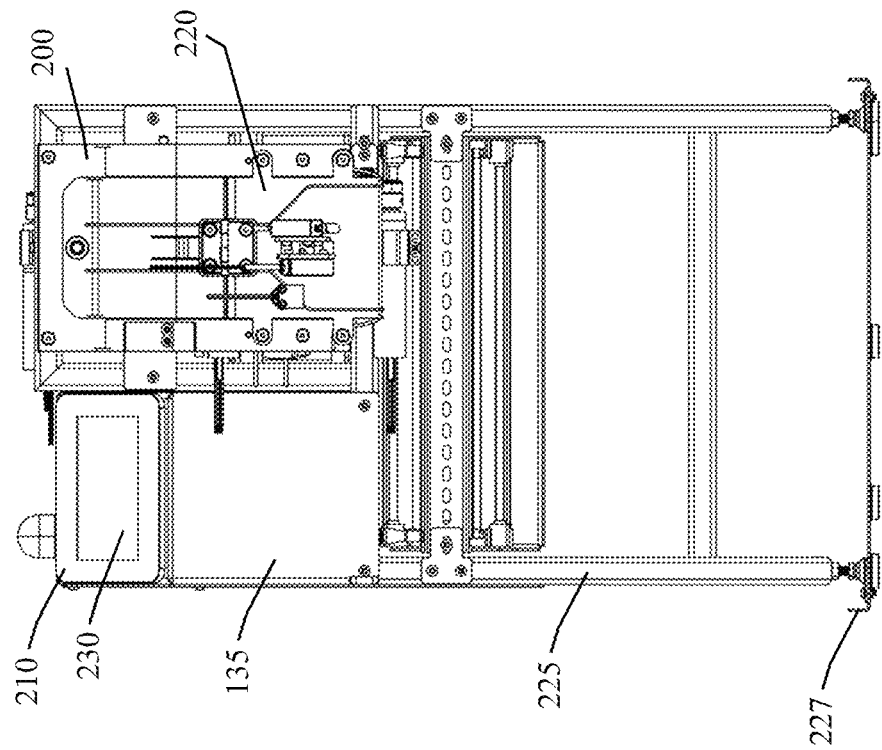
Figure 5:
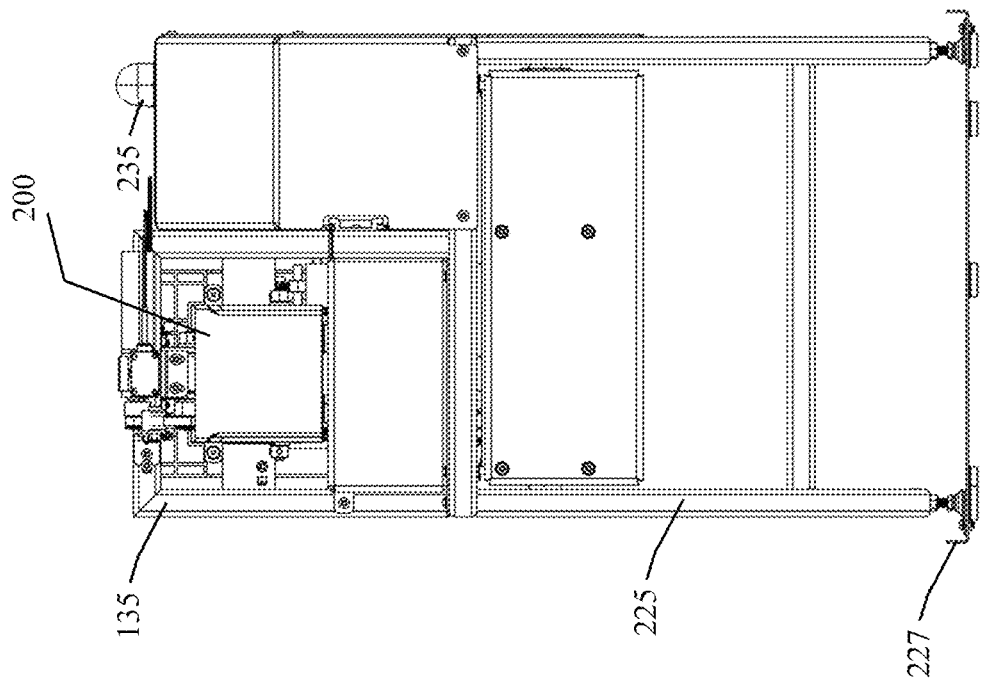
Figure 8:
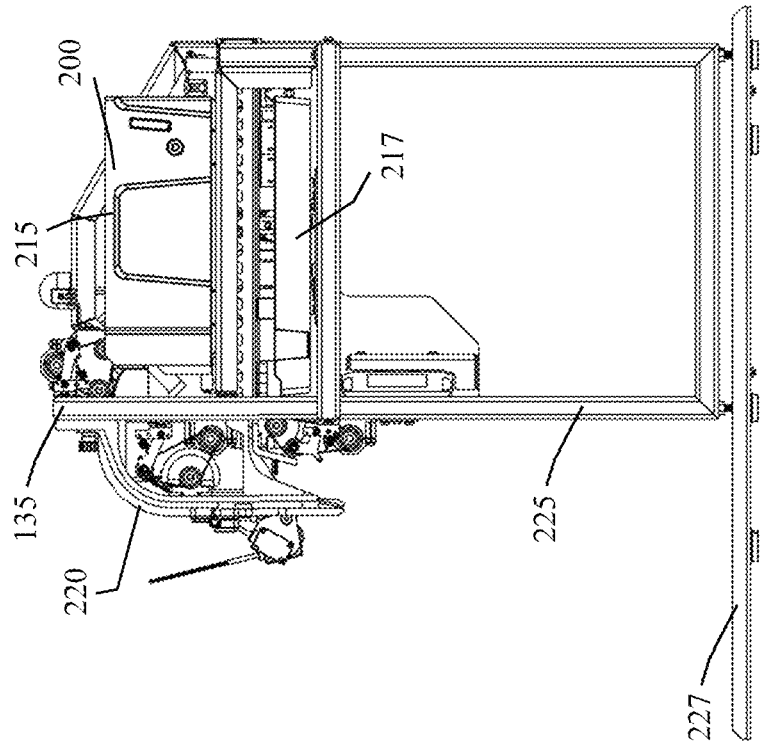
Figure 7:
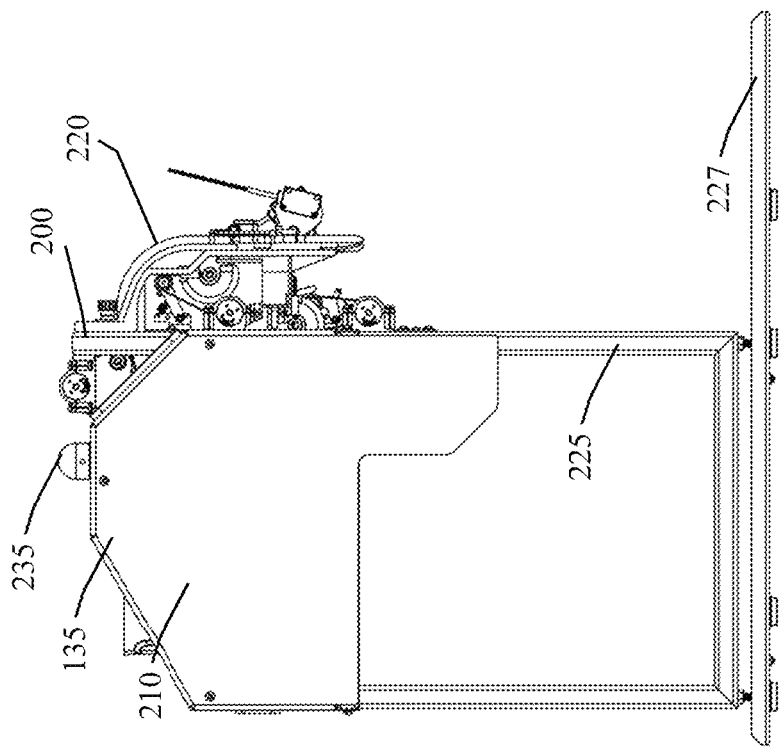

FIG. 4 depicts a perspective view of an exemplary embodiment of an automatic feeder system 130 in which the retailer system 110 is not mounted in place with the automatic feeder system 130. FIGS. 5-10 depict a rear view, front view, left view, right view, top view, and bottom view, respectively, of the automatic feeder system 130 from FIG. 4.

As shown in FIG. 4, the feeder unit 200 and the control system 210 are mounted on the support frame 225, and the support frame 225 is mounted on the support plate 227. The support frame 225 may be configured so as to provide a mounting space for the retailer system 110. The support plate 227 may include one or more holes 260 configured to provide, for example, an attachment point for a fastening device such as a screw or bolt and/or a pass-through for wiring or the like. The support frame 225 and support plate 227 may each be formed using any suitable material, e.g., steel, aluminum, plastic, or the like, or combinations thereof. As discussed in further detail below, the input bin 215 and the rejection bin 217 may each be mounted in the automatic feeder system 135 so as to be engaged with the feed neck 220. In some embodiments, one or more of the input bin 215 and the rejection bin 217 is removable from the automatic feeder system 135, e.g., such that a batch of request slips may be received at the automatic feeder system via engagement of an input bin 215 filled with request slips, and/or such that a batch of rejected request slips may be removed from the automatic feeder system 135 via dis-engagement of the rejection bin 217. Such engagement and dis-engagement may be repeated, as necessary.

Figure 11:
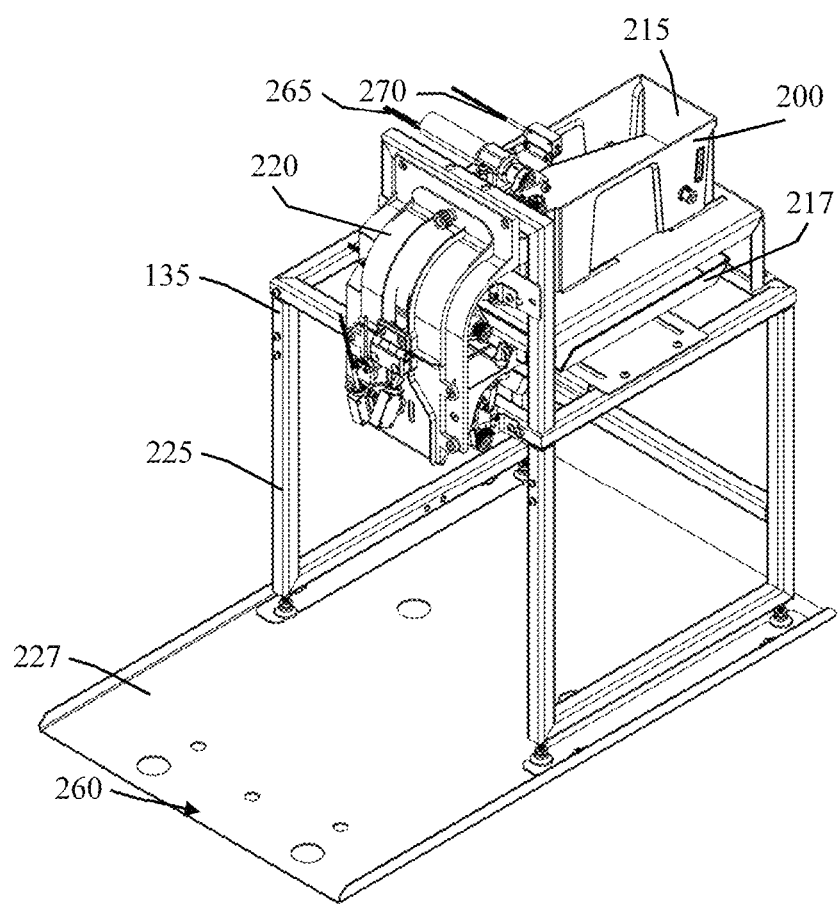
FIG. 11 depicts a perspective view of an exemplary embodiment of an automatic feeder system with a control system removed, according to one or more embodiments.
Figure 12:
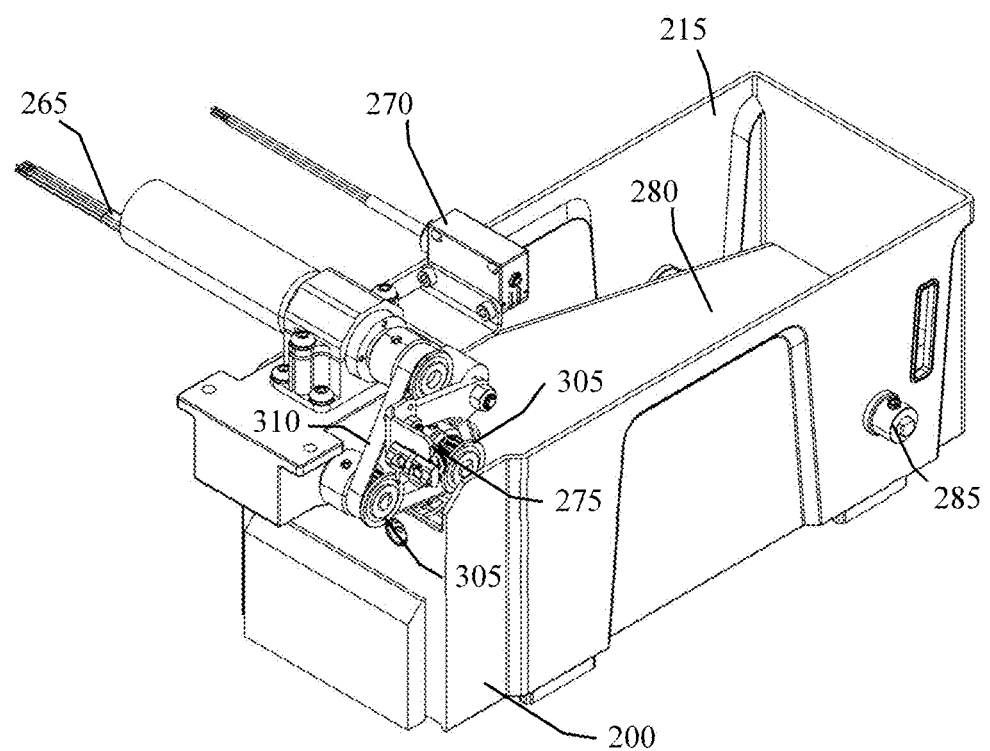
FIG. 12 depicts a perspective view of an exemplary embodiment of a feed unit of an automatic feeder system, according to one or more embodiments.
Figures 13, 14:
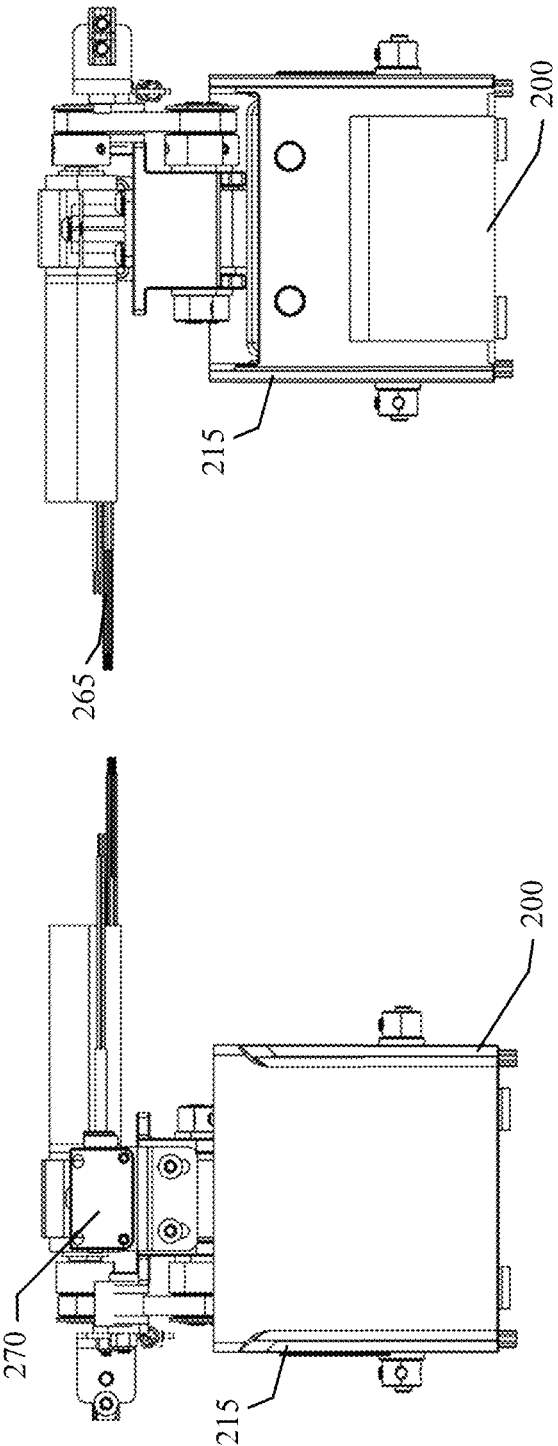
FIGS. 13-18 depict rear, front, left, right, top, and bottom views, respectively, of an exemplary embodiment of the feed unit of FIG. 12, according to one or more embodiments.
Figure 15:
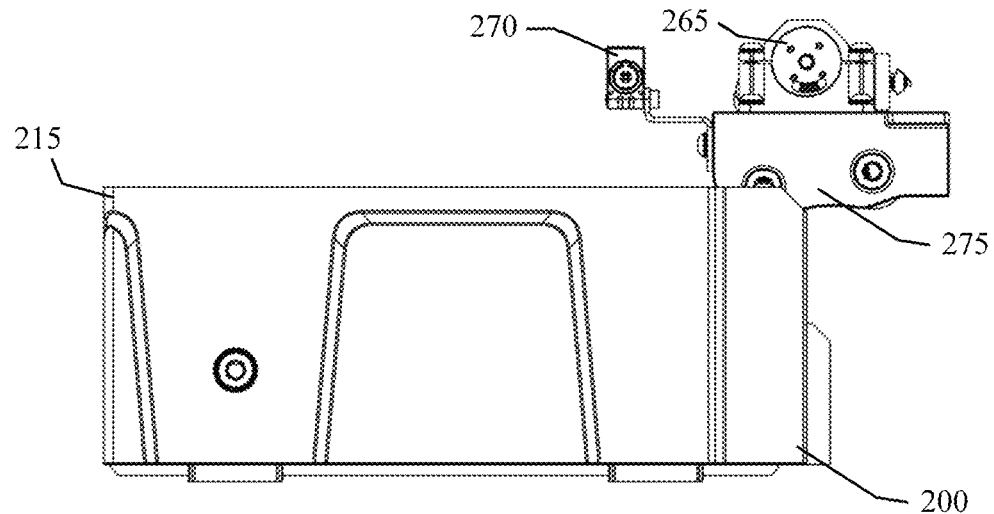
Figure 16:
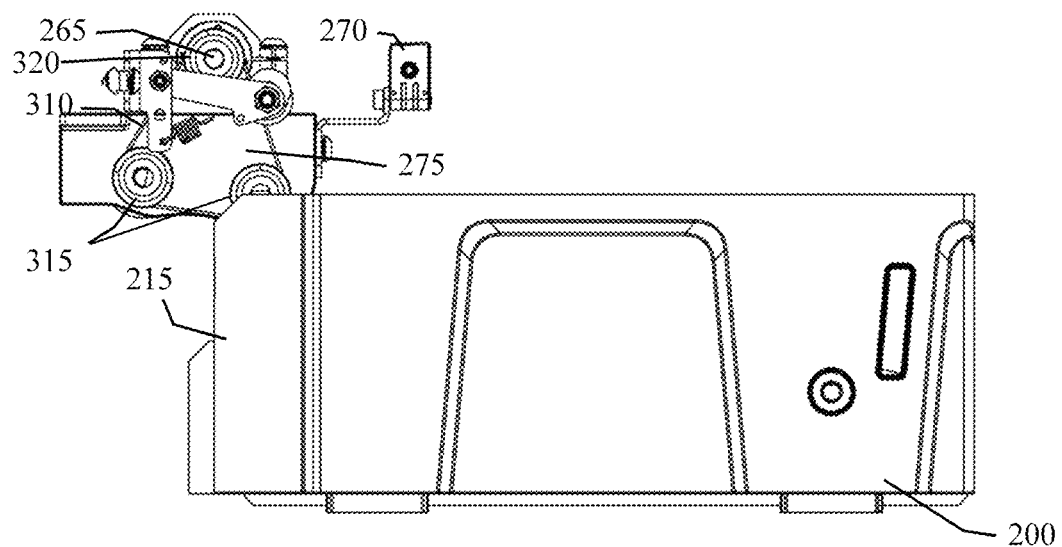
Figure 17:
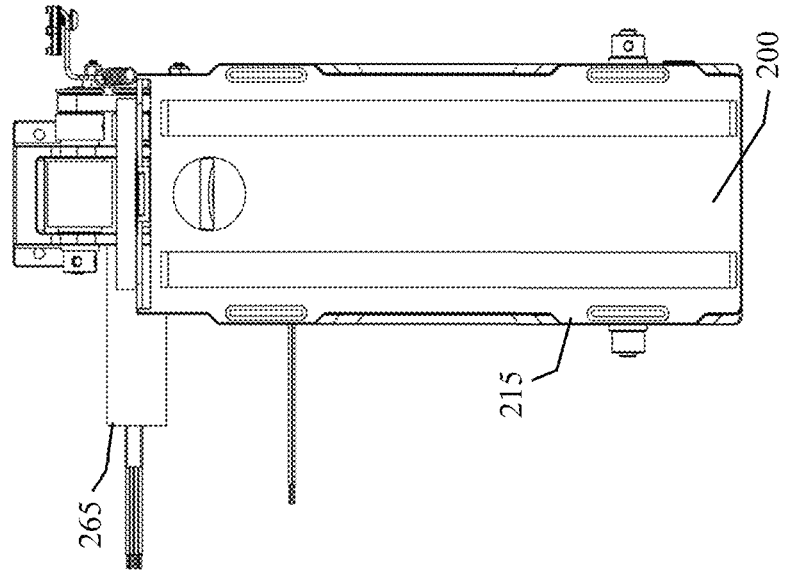
Figure 18:
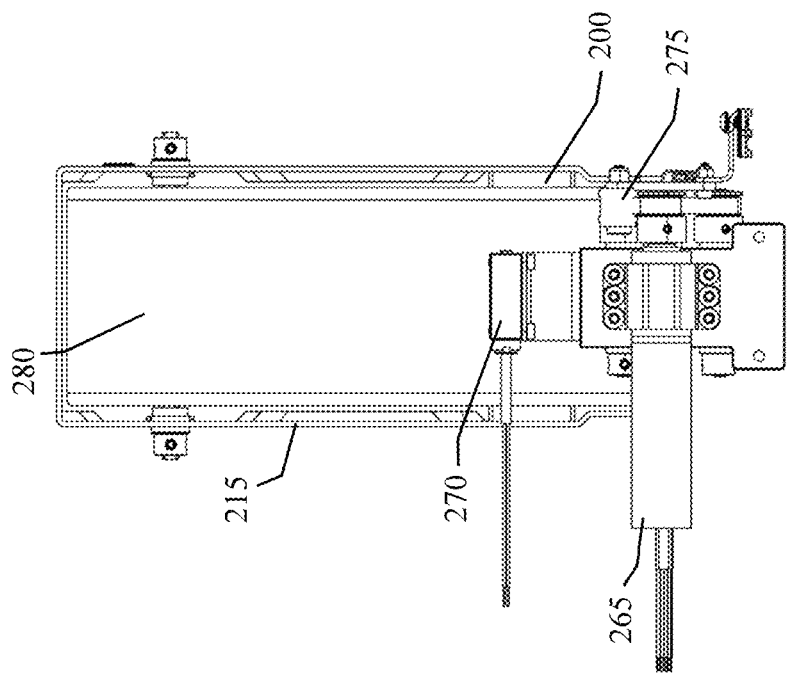

FIG. 11 depicts a perspective view of an exemplary embodiment of the automatic feeder system 135 in which the control system 210 has been removed. FIG. 12 depicts a perspective view of an exemplary embodiment of the feed unit 200 assembled with the input bin 215. FIGS. 13-18 depict rear, front, left, right, top, and bottom views, respectively, of the assembly of FIG. 12.

As shown in FIG. 12, the feed unit 200 includes a drive member 265, a sensor 270, and a feed belt assembly 275. The drive member 265 may be operable by the control system 210, and may be configured to drive the feed belt assembly 275. In an exemplary embodiment, the drive member 265 may include a drive shaft, axle, or the like, that may be driven by a motor, e.g., an electric motor, of the control system 210. As discussed in further detail below, the feed belt assembly 275 may be configured to draw physical request slips from the input bin 215, and convey the physical request slips to the feed neck 220.

The sensor 270 may be any suitable type of sensor, such as an infra-red sensor, magnetic sensor, or the like, and may be configured to generate a signal indicative of a fill status of the input bin 215. For example, the sensor 270 may be configured to sense a distance between the sensor 270 and one or more of a top-most physical request slip in the input bin 215, or a portion of the input bin 215. For example, the input bin 215 may include a moveable tray or the like, and the sensor 270 may be configured to determine a relative location of the moveable tray.

Figures 19, 20:
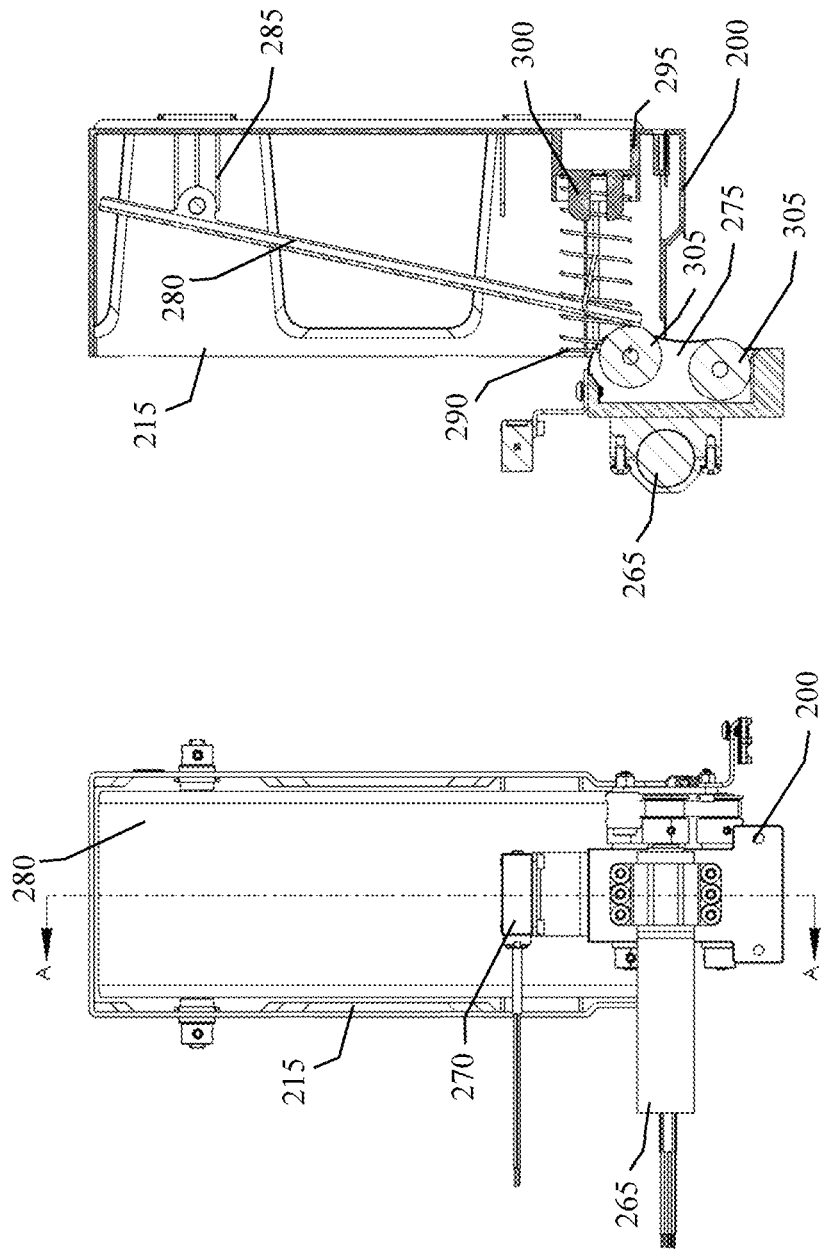
FIG. 19 depicts a top view of an exemplary embodiment of a feed unit and input bin from an automatic feeder system, according to one or more embodiments.
FIG. 20 depicts a cross-section view of the feed unit and input bin from FIG. 19.
Figure 27:
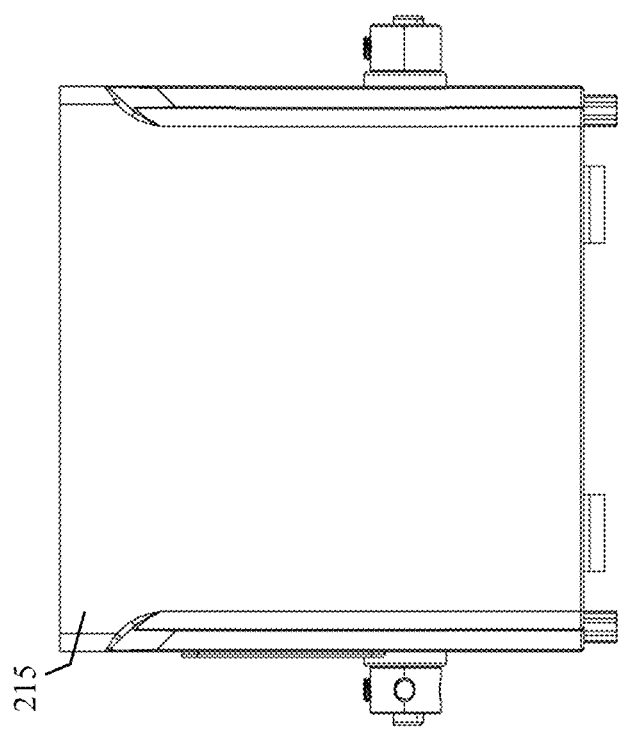
FIGS. 27-31 respectively show rear, front, top, bottom, and isometric views of an exemplary embodiment of an input bin, according to one or more embodiments.
Figure 28:
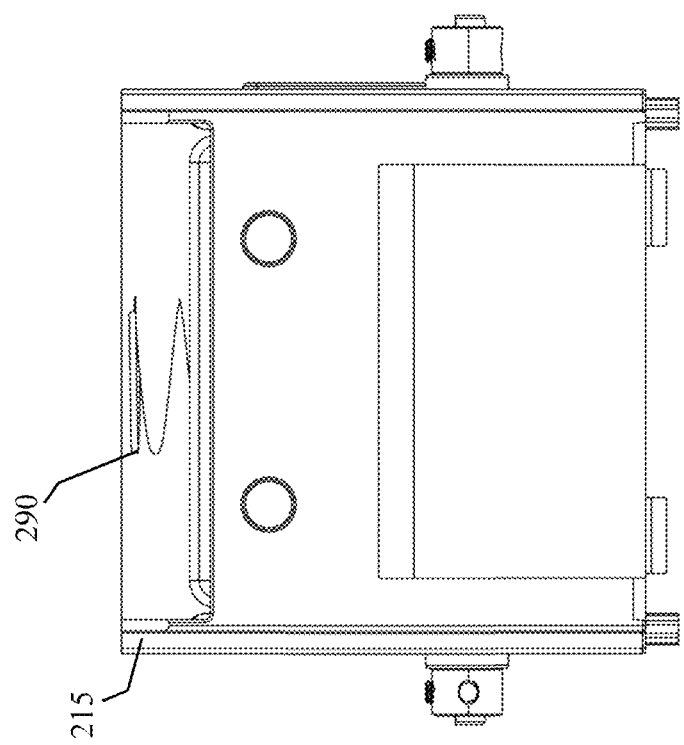
Figure 30:
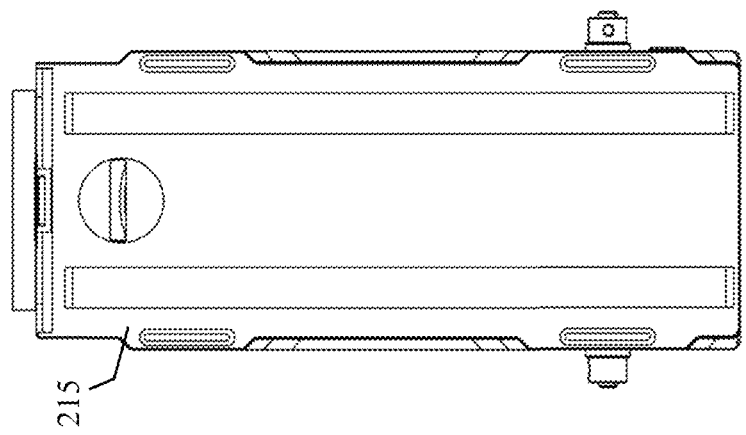
Figure 29:
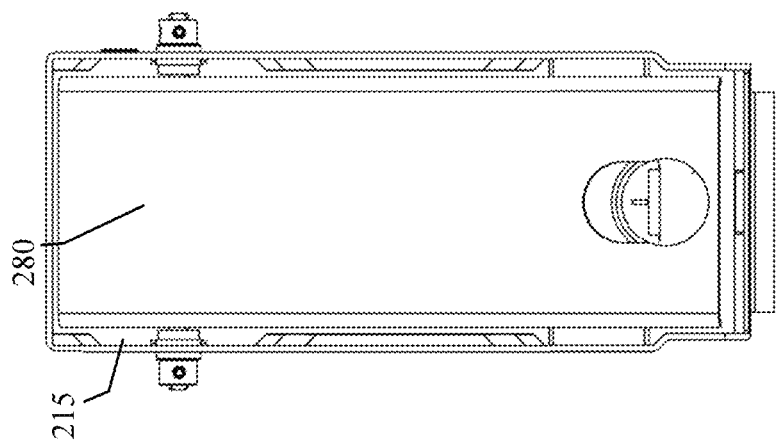
Figure 31:
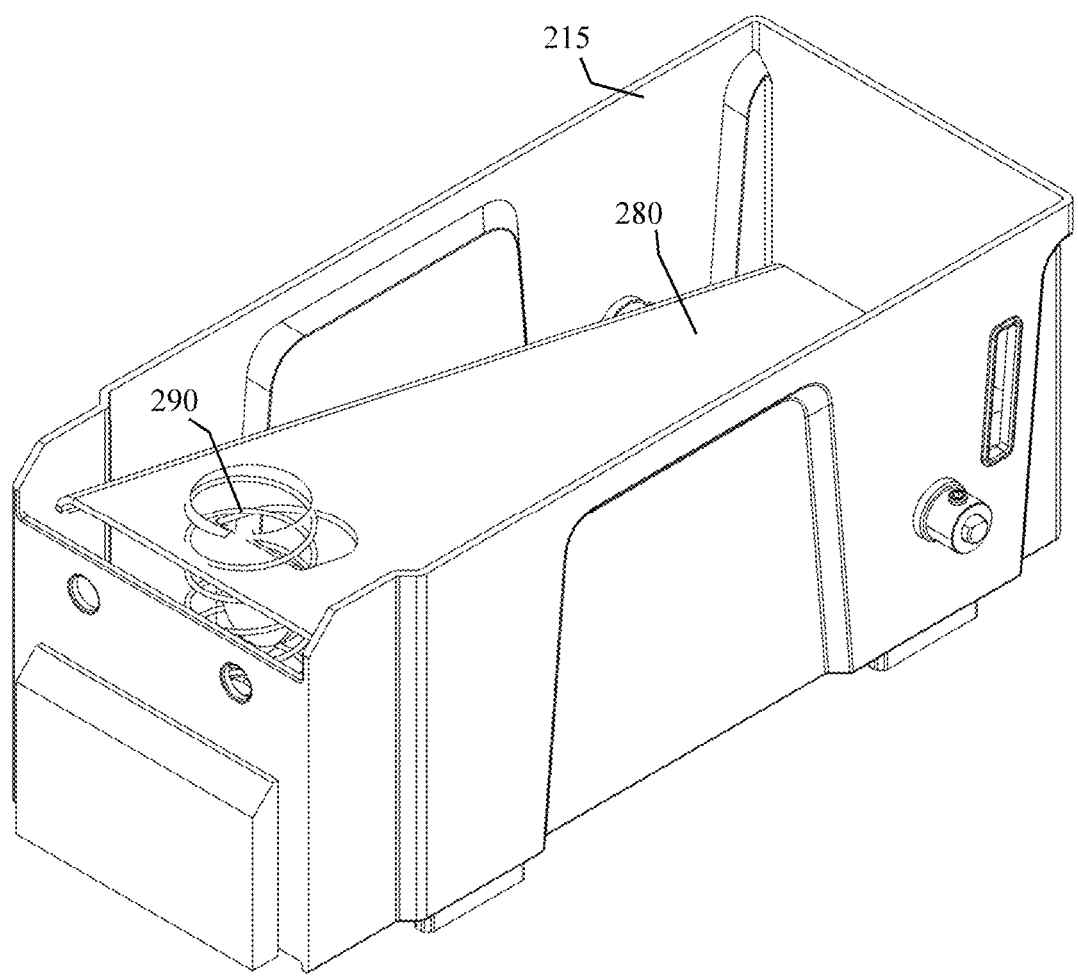

FIG. 20 depicts a cross-section view of the feed unit 200 and input bin 215 along the cross-section line A-A in the top view of FIG. 19. As shown in FIG. 20, the input bin 215 may include a moveable tray 280, a tray support 285, a spring 290, a spring support 295, and a stop member 300. The moveable tray 280 may be configured to support physical request slips introduced into the input bin 215, and is rotationally supported by the tray support 285. The spring 290 may be positioned between the spring support 295 and the moveably tray 280, and may be configured to bias the moveable tray 280 toward the position illustrated in FIG. 20, e.g., an empty bin position. As physical request slips are introduced to the input bin 215, e.g., placed on the moveable tray 280, the moveable tray 280 may be pivoted about the tray support 285 in order to provide room for the physical request slips between the moveable tray 280 and the feed belt assembly 275, such that a topmost physical request slip is brought into abutment with the feed belt assembly 275. The spring 290 may be further configured such that, as the topmost physical request slip is removed from the input bin 215, e.g., via the feed belt assembly 275, a subsequent physical request slip is brought into abutment with the feed belt assembly 275. The stop member 300 may be positioned so as to limit an extent to which the moveable tray 280 may be pivoted toward the spring support 295, and/or limit an extent to which the spring 290 may be compressed.

As depicted in FIG. 20, the feed belt assembly 275 includes rollers 305. While the embodiment in FIG. 20 includes two rollers 305, it should be understood that any suitable number of rollers may be used in various embodiments. The rollers 305 may be driven by the feed belt assembly 275, and are configured to draw a top-most physical request slip out from the input bin 215.

FIG. 22 depicts a cross-sectional view of the feed belt assembly 275 along the cross-section line B-B in FIG. 21. As illustrated in FIG. 22, the feed belt assembly 275 may include a drive belt 310, a drive element 315, and driven elements 320. The drive element 315 may be coupled to the drive member 265 of the control system 210, such that rotation of the drive member 265 drives rotation of the drive element 315. The driven elements 320 may be coupled to the rollers 305, and are rotationally supported by a housing of the feeder unit 200. The drive belt 310 may be supported by and operatively engaged with the drive element 315 and the driven elements 320 such that rotation of the drive element 315 advances the drive belt 310, and such that advance of the drive belt 310 drives rotation of the driven elements 320 and thus rotation of the rollers 305.

In this embodiment, the drive element 315 and driven elements 320 may be gears and/or may have an irregular surface configured to facilitate engagement with the drive belt 310. In some embodiments, the drive element 315 and driven elements 320 may have a smooth surface. In some embodiments, the drive belt 310 may include a rack, holes, and/or an irregular surface configured to engage with the drive element 315 and driven elements 320. In some embodiments, the drive belt may include a smooth surface.

FIG. 24 depicts a cross-sectional view of the feeder unit 200 along the cross-section line H-H in FIG. 23. As illustrated in FIG. 24, the feeder unit 200 may further include a feed element 325. The feed element 325 may be configured to support a physical request slip as the physical request slip is drawn out from the input bin 215 by the rollers 305. In some embodiments, the feed element 325 may be moveably supported relative to a further stop element 330 such that the feed element 325 is configured to move away from the rollers 305 to provide clearance for the physical request slip to pass there-through. In some embodiments, the feed element 325 may be configured such that the clearance is configured to only allow passage of a single physical request slip at a time. FIGS. 25 and 26 depict views similar to the views of FIGS. 21 and 22, respectfully, in which the feed element 325 is additionally shown.

FIGS. 27-31 respectively show rear, front, top, bottom, and isometric views of the input bin 215.

Figure 32:
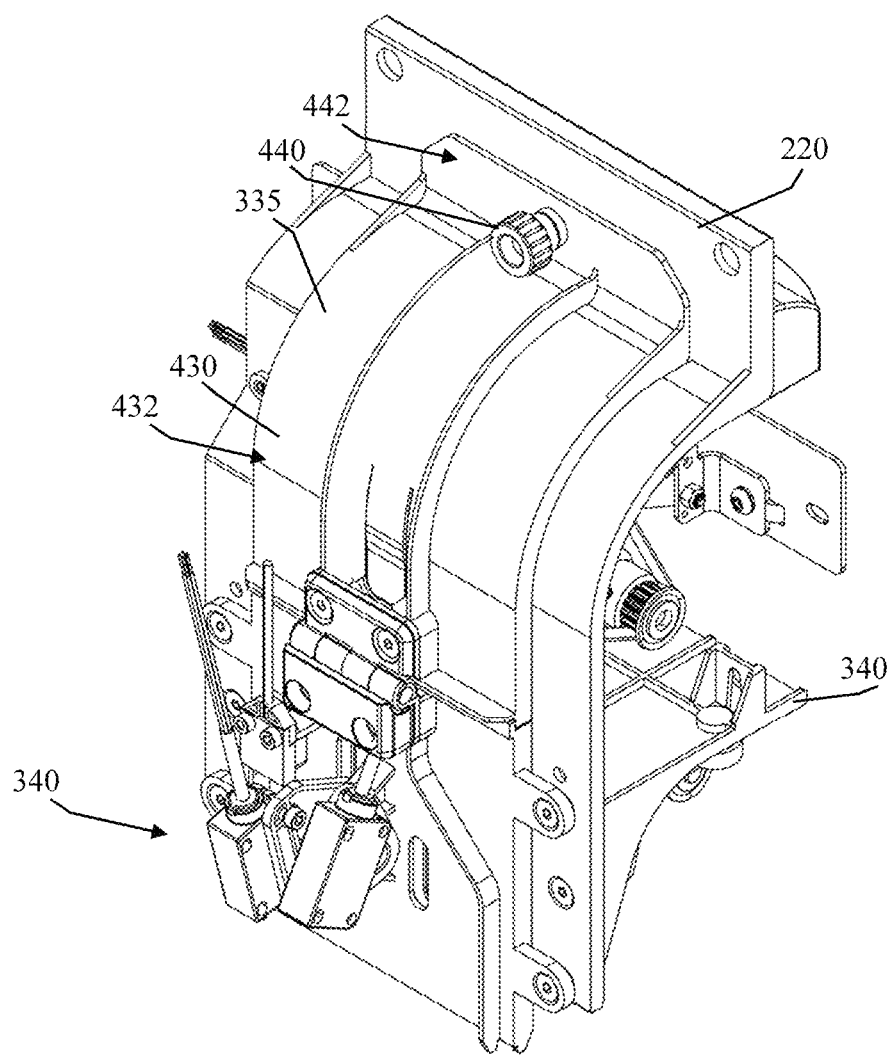
Figure 36:
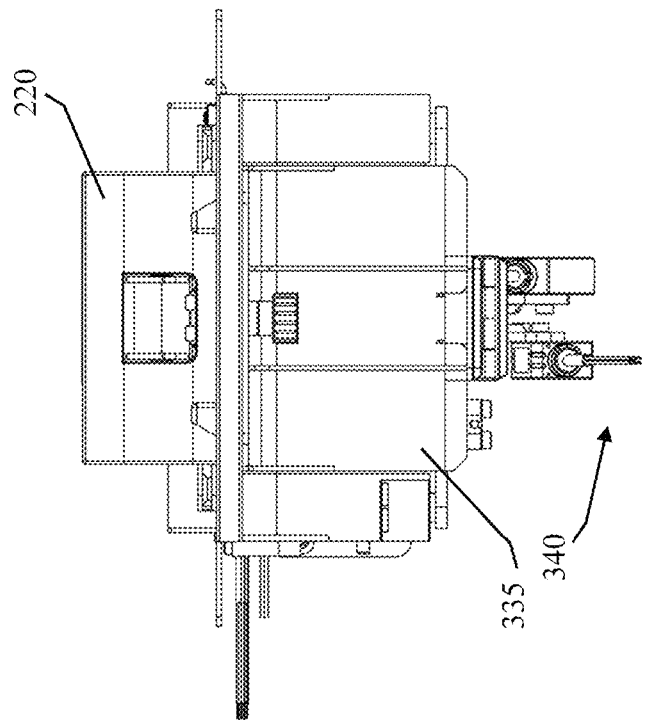
Figure 35:
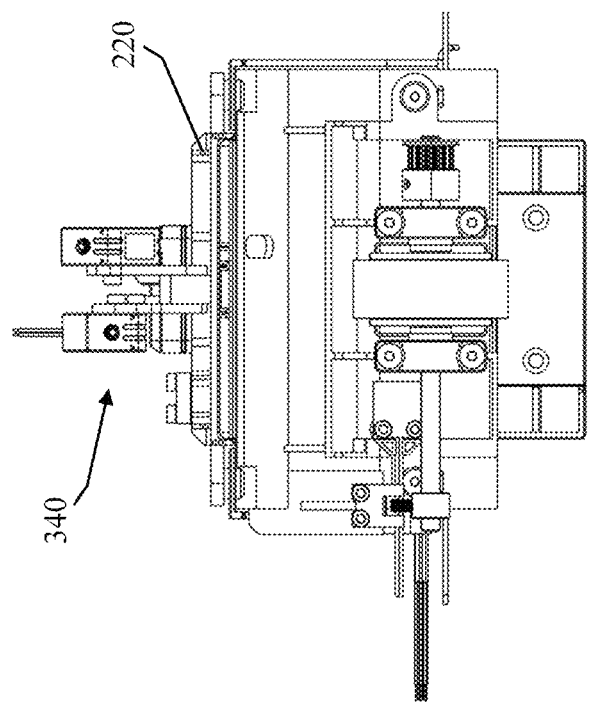

FIGS. 32-36 depict isometric, left, right, top, and bottom views, respectively, of the feed neck 220. As depicted in FIG. 32, the feed neck 220 may include a first housing portion 335, a second housing portion 340, one or more sensors 345. As depicted in FIG. 34, the feed neck 220 further includes a first roller cam assembly 350 and a second roller cam assembly 355. As discussed in further detail below, the first roller cam assembly 350 and the second roller cam assembly 355 may be operated by the control system 210. The one or more sensors 345 may be in communication with the control system 210.

As shown in FIGS. 33 and 34, the first roller cam assembly 350 may be positioned in the first housing portion 335, and may include a cam drive member 360, rotating members 365, a cam drive belt 370, and a cam element 375. The cam drive belt 370 is operatively engaged with and supported by the drive member 360 and the rotating members 365. The cam element 375 may be coupled with one of the rotating members 365. The cam drive member 360 may be operable, e.g., via the control system 210, to advance the cam drive belt 370, such that the rotating members 365, and thus the cam element 375, are rotated. As discussed in further detail below, the cam element 375 may be configured to facilitate conveyance of physical request slips from the input bin 215, through the feed neck 220, and out to the retailers system 110.

In this embodiment, the rotating member 365 not engaged with the cam element 375 may be supported by a support arm 380 that may be coupled to the first housing portion 335 and supported by a support spring 385 positioned between the support arm 380 and the first housing portion 335. In this embodiment, the cam drive member 360 may be supported by the second housing portion 340. In this embodiment, the cam element 375 may be rotationally supported by the first housing portion 335. However, in various embodiments, any suitable position or support technique for the elements of the first roller cam assembly 350 may be used.

Figures 37, 38:
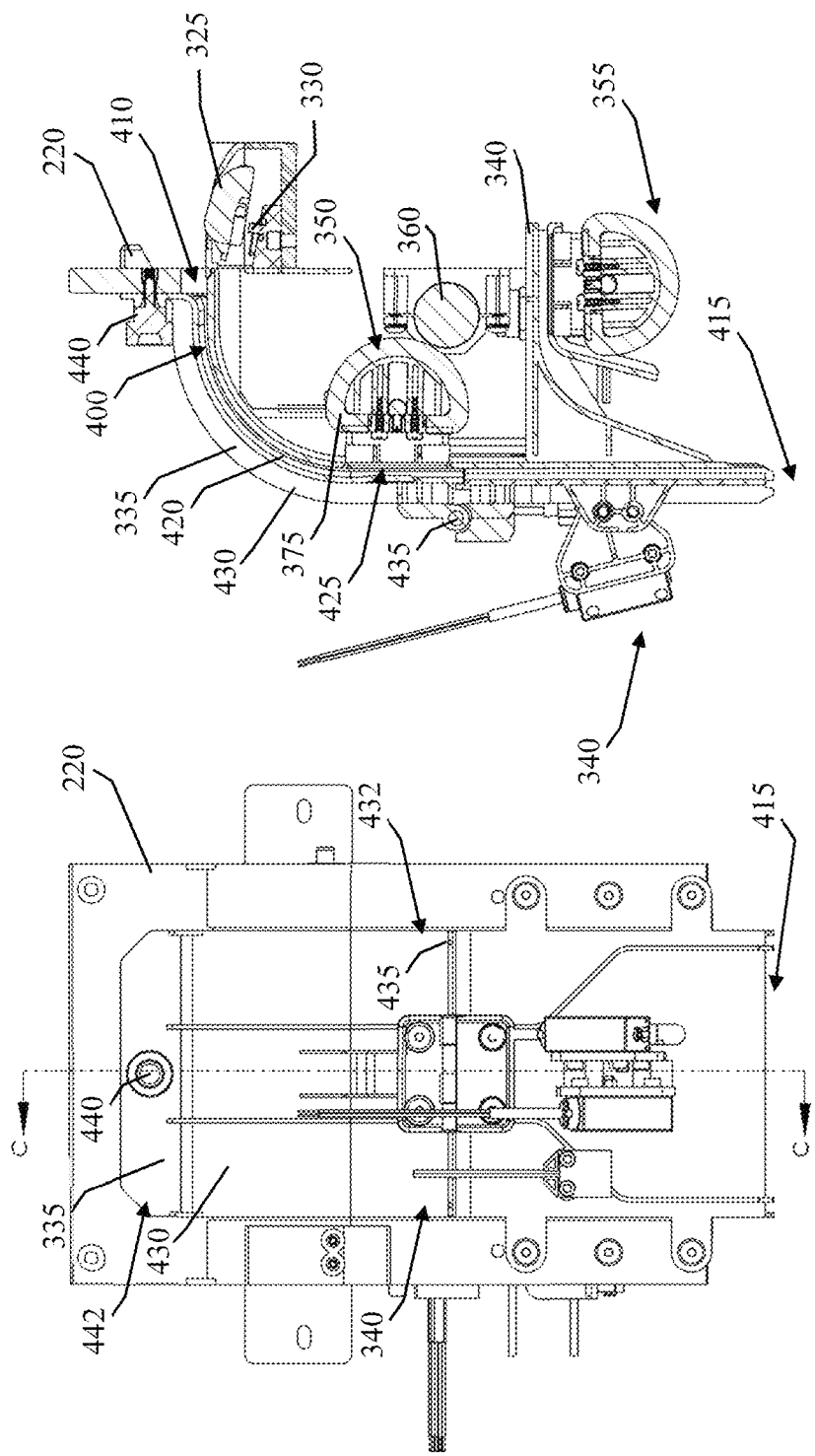

FIG. 38 depicts a cross-section view along the cross-section line C-C in the front view of FIG. 37. As depicted in FIG. 38, the first housing portion 335 may define a first path 400 that extends from an inlet 410 of the feed neck 200 to an outlet 415 of the feed neck 220. The first path 400 may have a shape configured to guide a physical request slip there-through. For example, in the embodiment depicted in FIG. 38, the first path has a shape defined by a curve 420. In other embodiments, any suitable shape for the path 400 may be used.

The inlet 410 may be configured and positioned to receive physical request slips conveyed out from the input bin 215 by the feed element 325. The outlet 415 may be positioned and configured to output physical request slips to the physical request slip input 245 of the retailer system 110. The first path 400 may include an access 425 positioned such that the cam element 375 of the first roller cam assembly 350, in an actuated position, e.g., intermittently as the cam element 375 rotates, is at least partially introduced into the first path 400. In other words, as a physical request slip is introduced into the first path 400, e.g., via the feed element 325, the cam drive member 360 may operate the cam element 375 such that the cam element 375 engages with the physical request slip and further conveys the physical request slip along the first path 400. In some embodiments, the cam element 375, e.g., an element that intermittently extends into the first path 400, is configured to facilitate sequential conveyance of physical request slips there-through. In other words, since the cam element 375 may be intermittently introduced into the first path 400, e.g., due to the non-symmetric rotation of the cam element 375, conveyance of physical request slips through the first path 400 may be intermittent rather than continuous, which may, for example, reduce a likelihood of jams, overlapping physical request slips, etc., or which may match a timing of the conveyance of the physical request slips to a rate at which the retailer system 110 is configured to accept them.

As also shown in FIGS. 37 and 38, the first housing portion 335 of the feed neck 220 may include a hinge portion 430. A first end 432 of the hinge portion 430 may be rotationally supported on the first housing portion 335 by a hinge 435. The feed neck 220 may further include a removable fastener 440 configured to secure a second end 442 of the hinge portion 430 to the first housing portion 335. Removal of the removable fastener 440 enables the hinge portion 430 to pivot about the hinge 435 so as to provide access to the first path 400 in order to, for example, clear a jam, facilitate cleaning, or the like. In some embodiments, instead of or in addition to the removable fastener 440, the second end 442 may include a magnetic fastener (not shown). Such a magnetic fastener, for example, may enable rapid access to the interior of the feed neck 220, e.g., to fix a jam, while also securing the second end 442 to the first housing portion 335.

FIG. 40 is a cross-sectional view of the feed neck 220 along the cross section line D-D in the front view of FIG. 39. As illustrated in FIG. 40, the one or more sensors 345 may include a trip sensor 445 that is configured to detect, for example, introduction of the cam element 375 into the first path 400. As discussed above, such introduction of the cam element 375 into the first path 400 may coincide with and/or be indicative of a conveyance of a physical request slip, and thus the trip sensor 445 may be configured to detect the conveyance of a physical request slip through the first path. Any suitable type of sensor may be used for the trip sensor 445. In an example, the trip sensor 445 may include an element configured to produce a voltage or current in response to being pivoted or bent by the motion of the cam element 375.

Figures 41, 42:
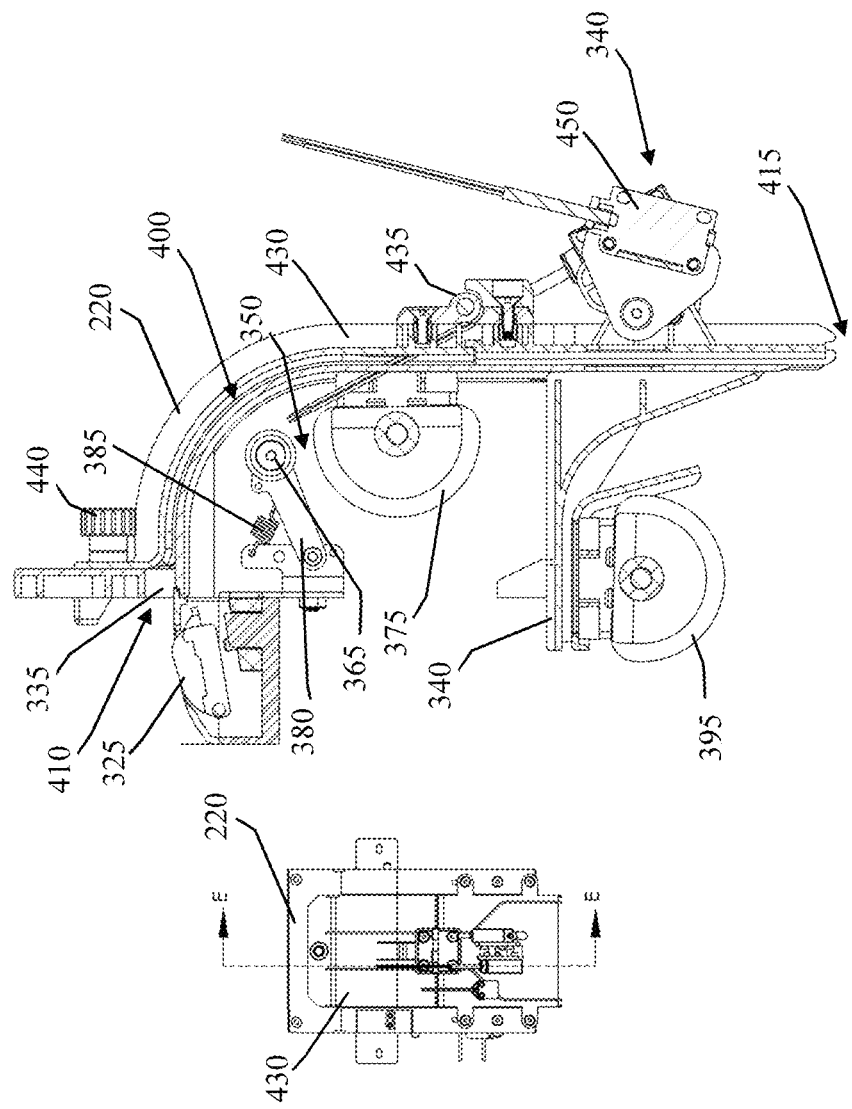
FIG. 41 depicts a front view of another exemplary embodiment of a feed neck of an automatic feeder system, according to one or more embodiments.
FIG. 42 depicts a cross-section view of the feed neck of FIG. 41.

FIG. 42 is a cross-sectional view of the feed neck 220 along the cross section line E-E in FIG. 41. As depicted in FIG. 42, the one or more sensors 345 may include a presence sensor 450, e.g., an infrared sensor or the like that is configured to transmit a signal, e.g., to the control system 210, in response to a presence of a physical request slip in the path 400.

Figures 43, 44:
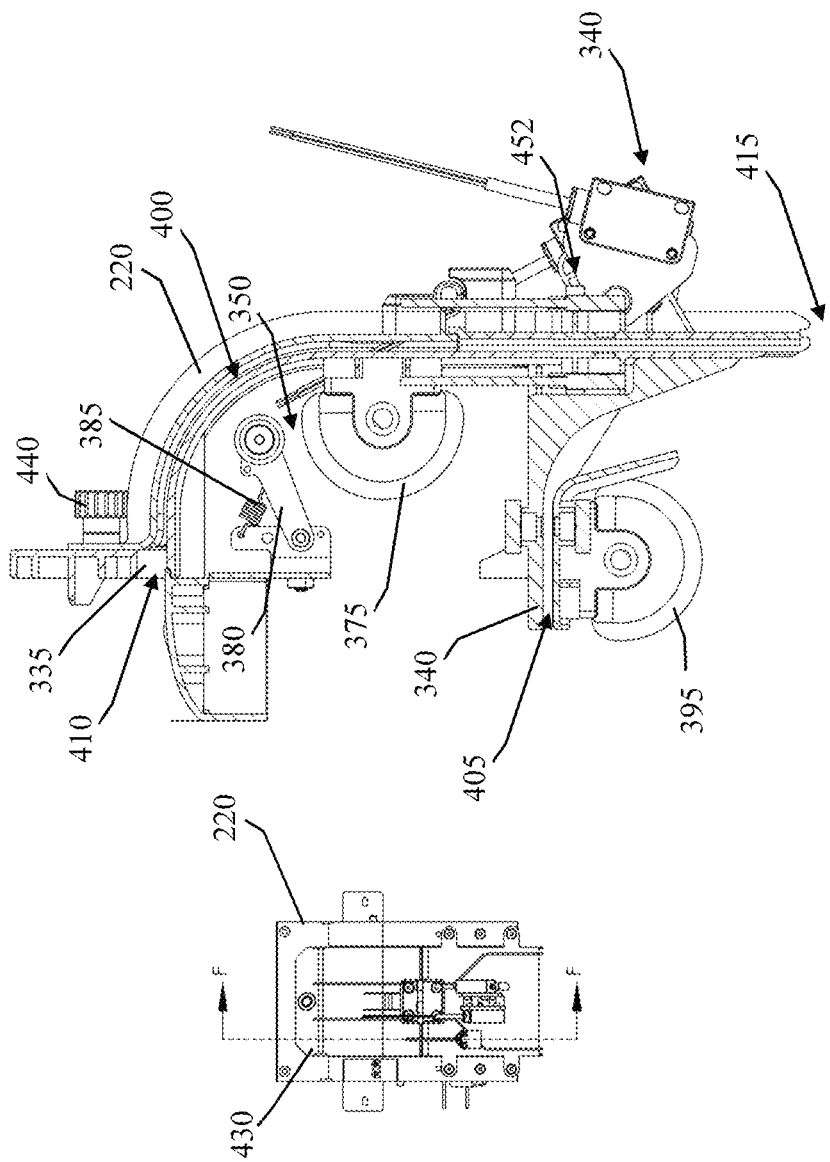
FIG. 43 depicts a front view of another exemplary embodiment of a feed neck of an automatic feeder system, according to one or more embodiments.
FIG. 44 depicts a cross-section view of the feed neck of FIG. 43.

FIG. 44 is a cross-sectional view of the feed neck 220 along the cross section line E-E in FIG. 43. As depicted in FIG. 44, the one or more sensors 345 may include a cam trip sensor 452 that may be configured to transmit a signal, e.g., to the control system 210, in response to contact with the cam element 375, e.g., in order to sense the operation of the cam element 375.

Figures 45, 46:
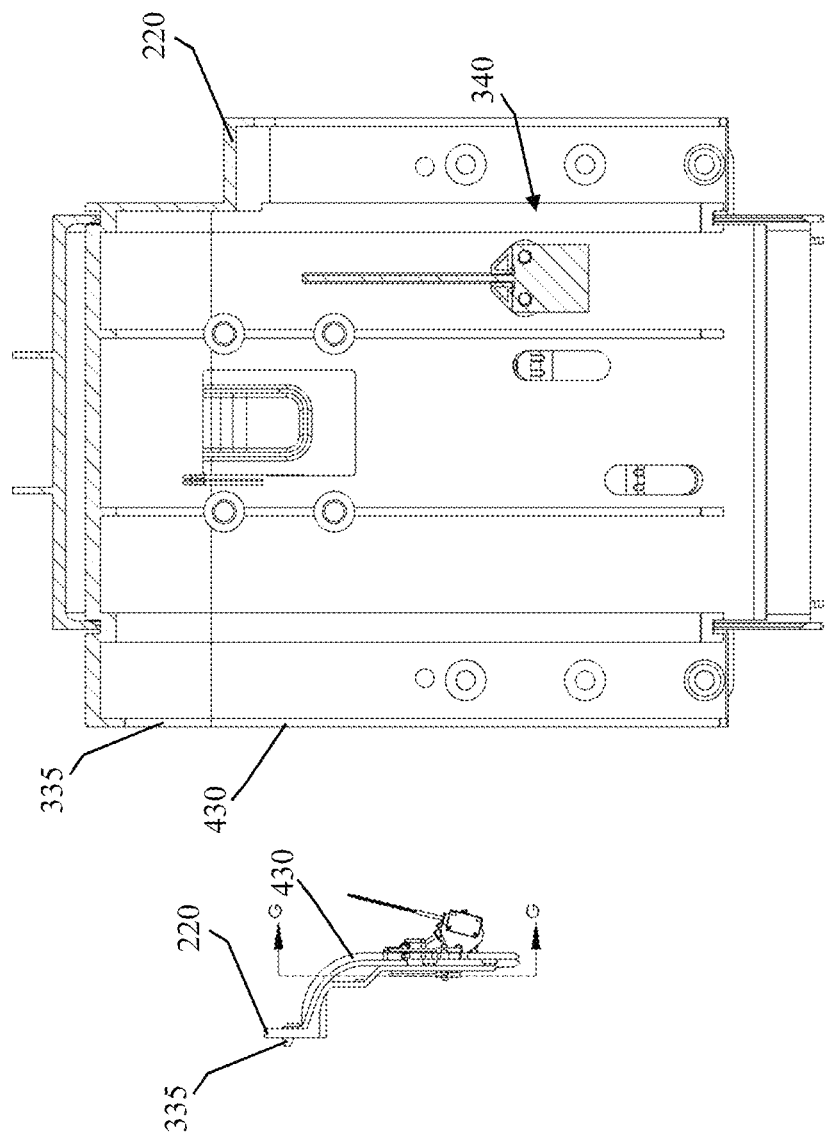
FIG. 45 depicts a front view of another exemplary embodiment of a feed neck of an automatic feeder system, according to one or more embodiments.
FIG. 46 depicts an inside view of the feed neck of FIG. 45.
Figure 48:
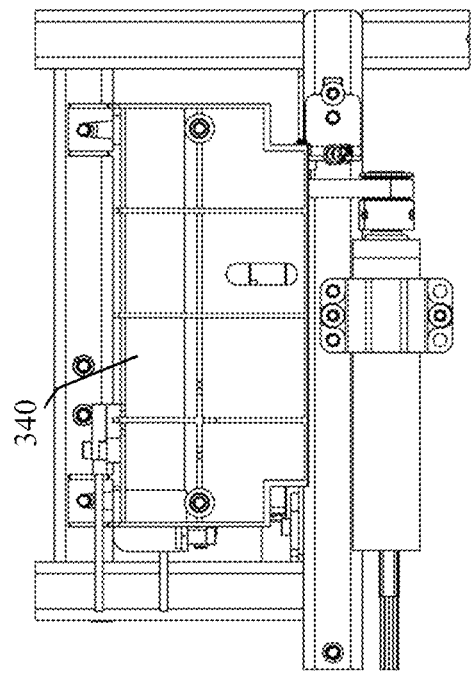
FIGS. 47-53 depict rear, front, left, right, bottom, top, and front views, respectively of an exemplary embodiment of an interface between a feed neck and a rejection bin of an automatic feeder system, according to one or more embodiments.
Figure 47:
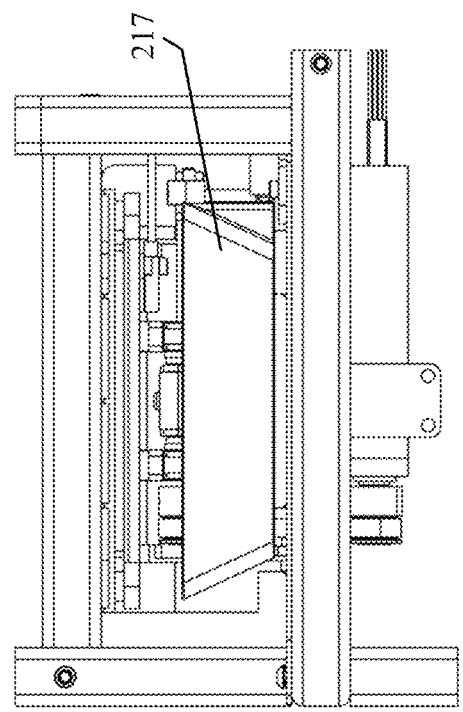
Figures 49, 50:
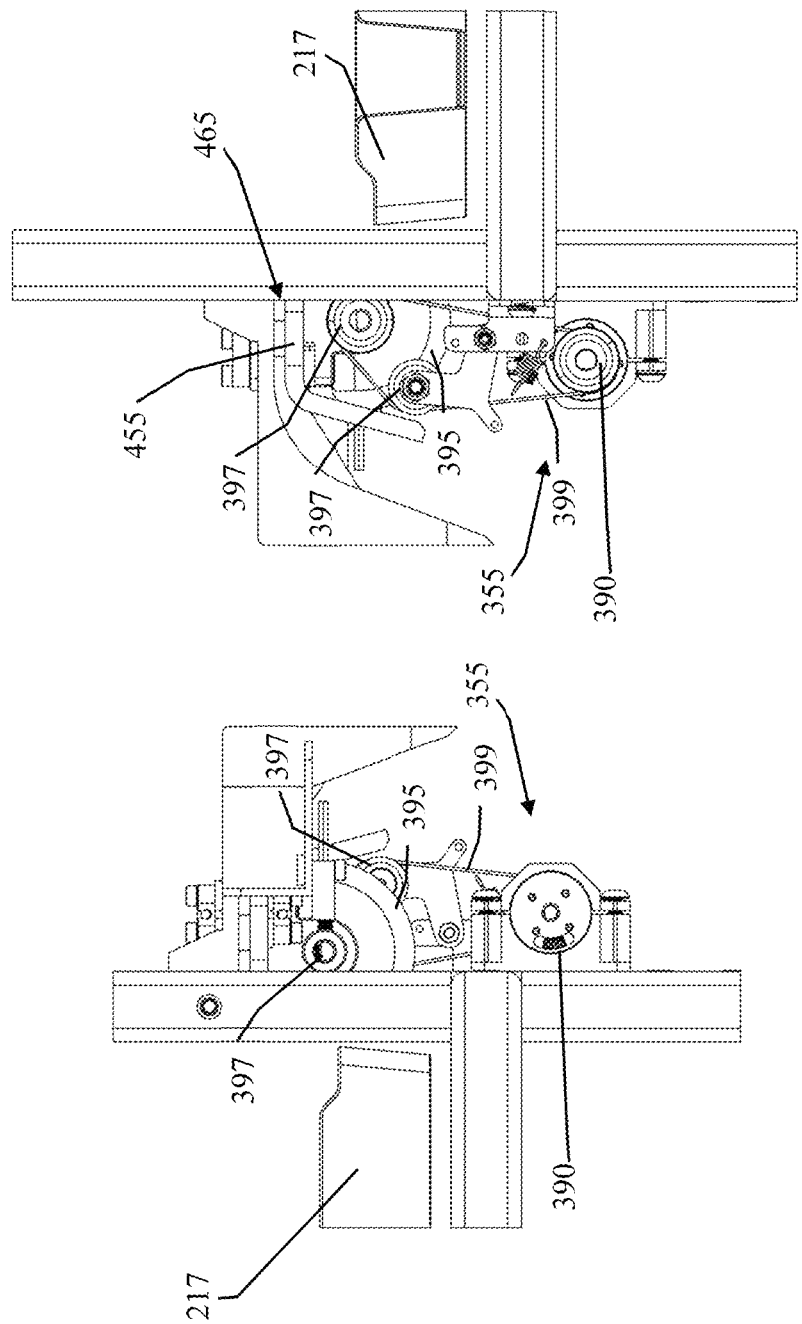
Figure 52:
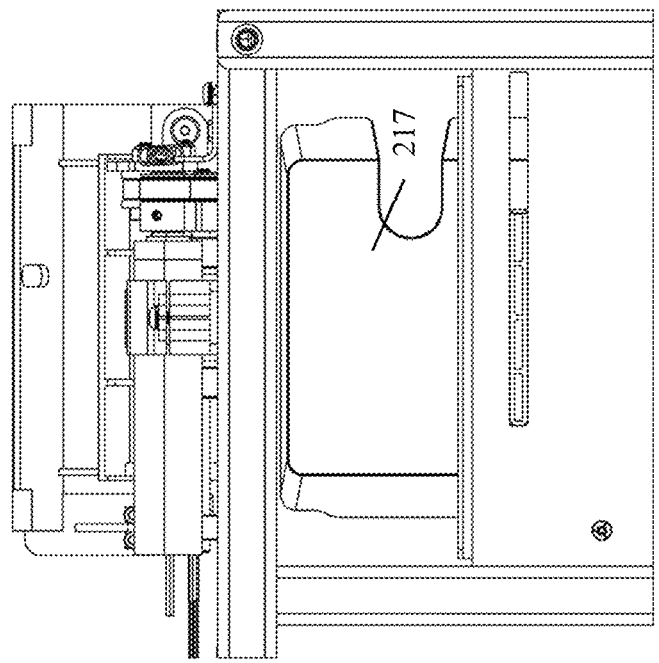
Figure 51:
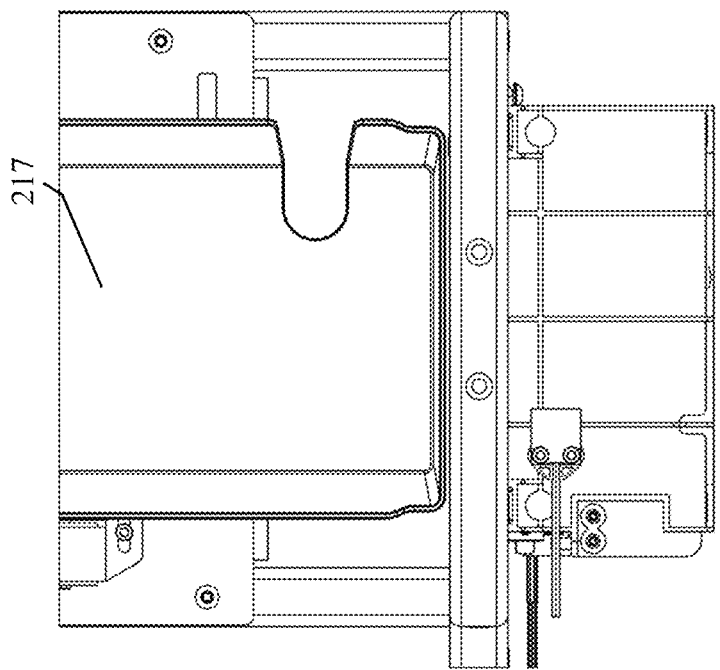

FIG. 46 depicts an inside view of the first housing portion 335 of the feed neck along the cross section line G-G in FIG. 45.

Figures 53, 54:
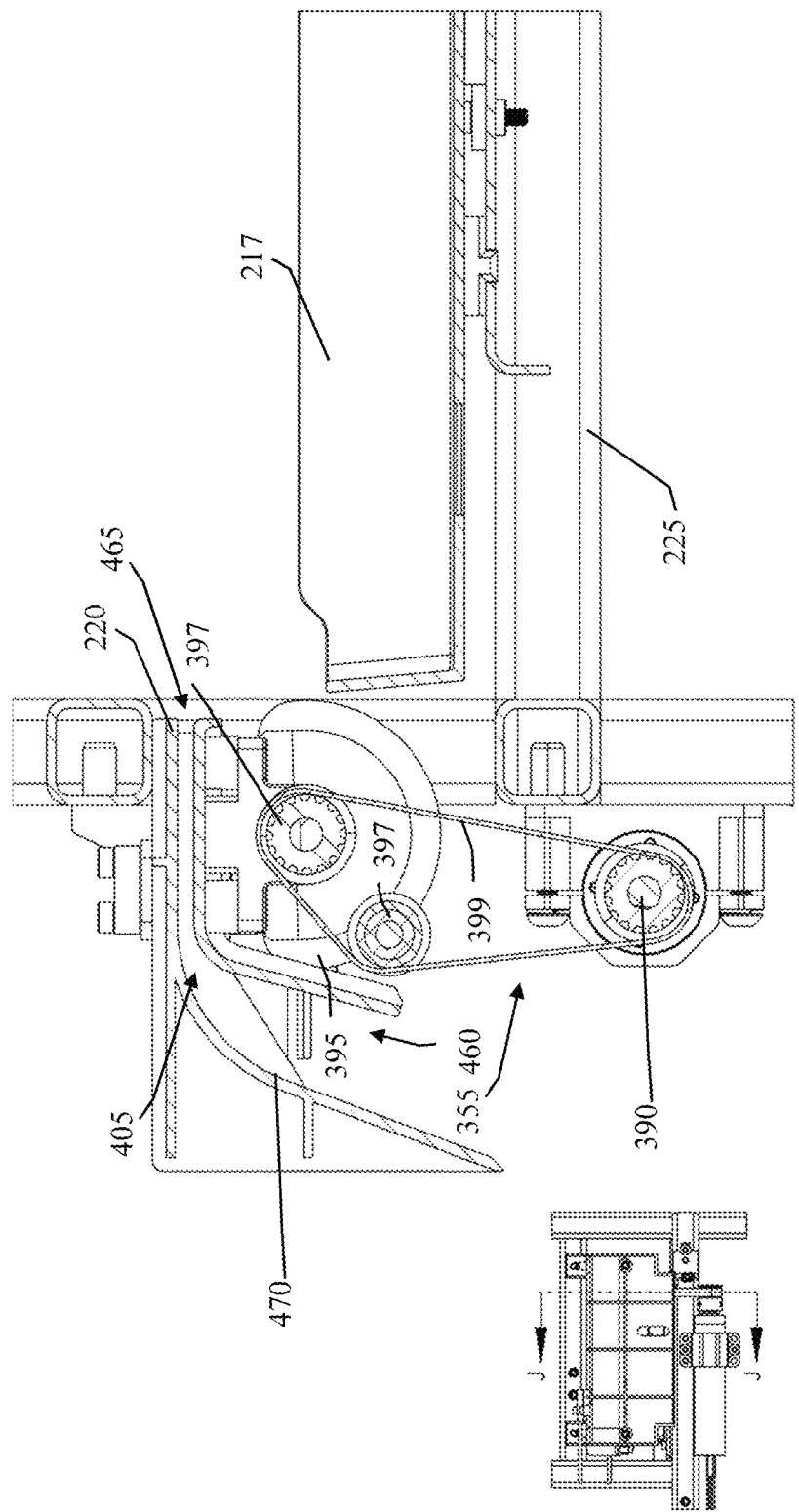
FIG. 54 depicts a cross-section view of the interface of FIG. 53.

FIGS. 47-52 depict rear, front, left, right, bottom, and top views, respectively of an interface between the feed neck 220 and the rejection bin 217. FIG. 54 depicts a cross-sectional view of the interface along the cross-section line J-J in the front view of FIG. 53.

As shown in FIG. 54, the second roller cam assembly 355 may include a second cam drive member 390, a second cam element 395, second rotating elements 397, and a second cam drive belt 399. The second cam drive member 390 may be operated by the control system 210, and may be supported by the support frame 225. The second rotating elements 397 may be rotationally supported on the second housing portion 340. The second cam drive belt 399 may be supported by and operatively engaged to the second cam drive member 390 and the second rotating elements 397, such that the second cam drive member 390 is operable to advance the second cam drive belt 399, and drive rotation of the second rotating elements 397. The second cam element 395 may be coupled to one of the second rotating elements 397, so as to be drivable via operation of the second cam drive member 390.

Figures 55, 56:
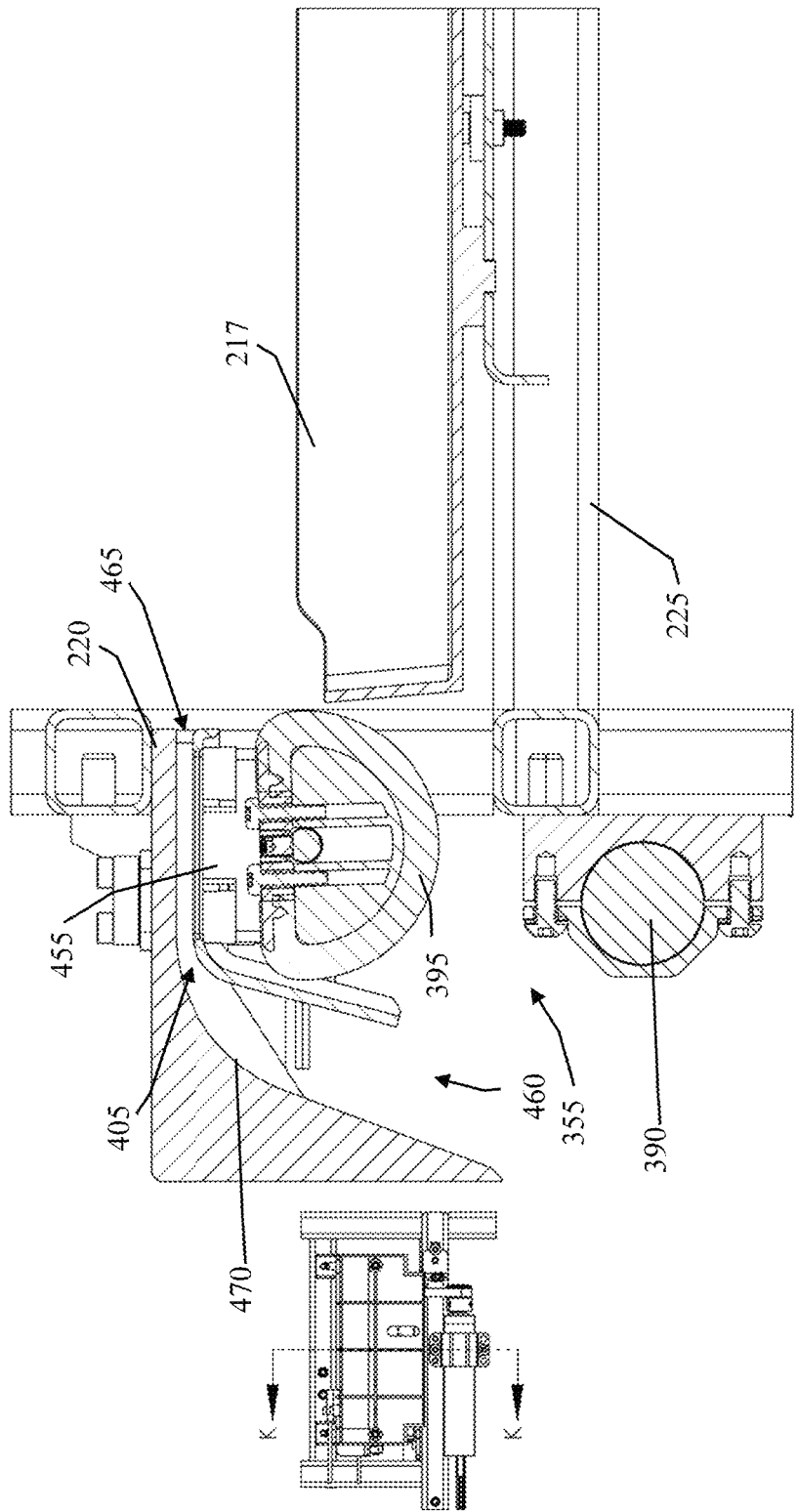
FIG. 55 depicts a front view of another exemplary embodiment of an interface between a feed neck and a rejection bin of an automatic feeder system, according to one or more embodiments.
FIG. 56 depicts a cross-section view of the interface of FIG. 55.
Figure 57:
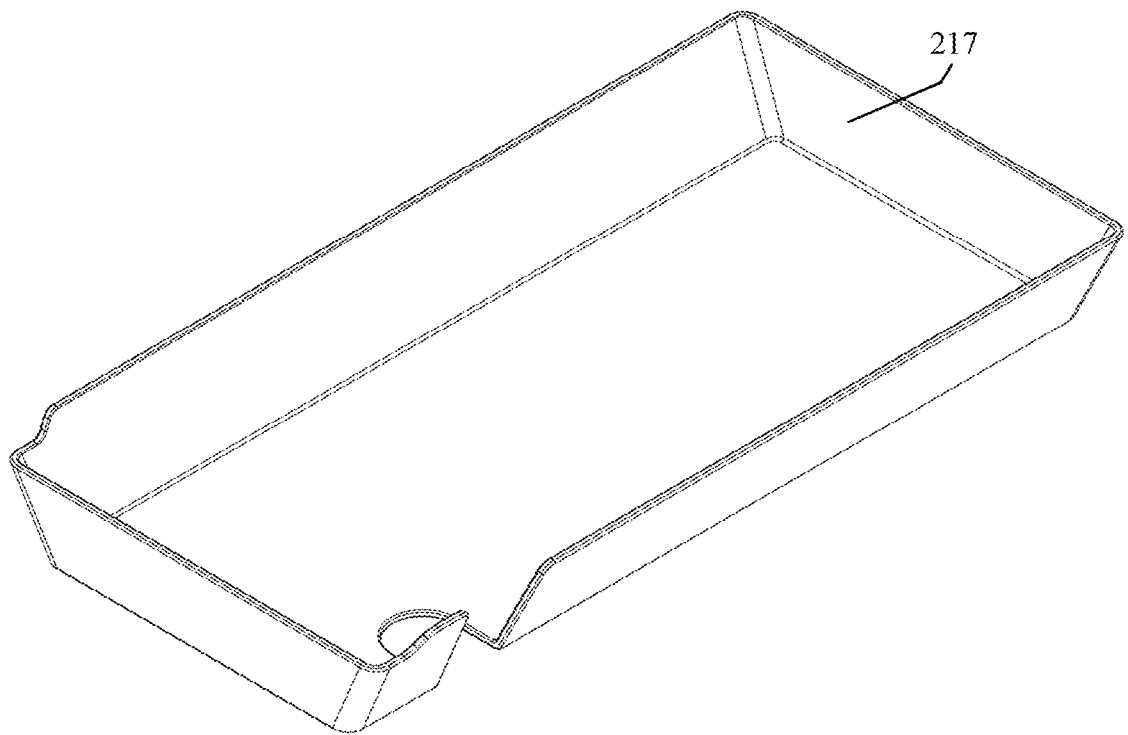
FIGS. 57-62 depict isometric, front, right, left, top, and bottom views, respectively, of an exemplary embodiment of a rejection bin of an automatic feeder system, according to one or more embodiments.
Figure 58:
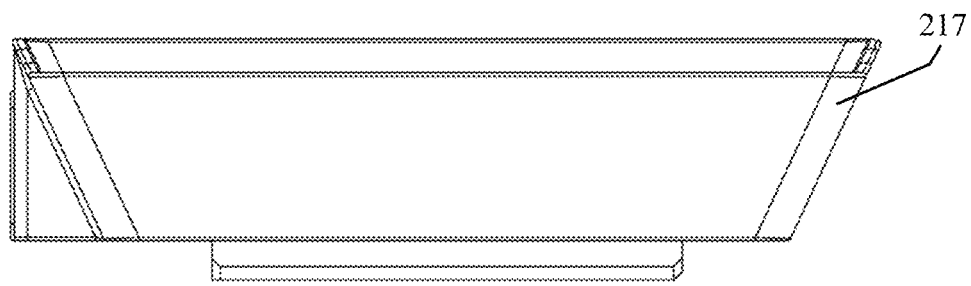
Figure 59:
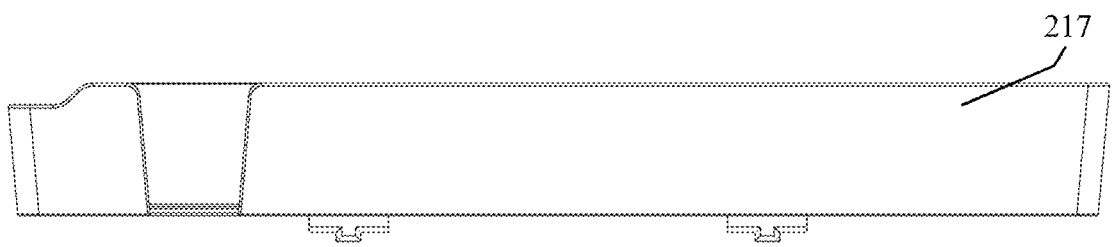
Figure 60:
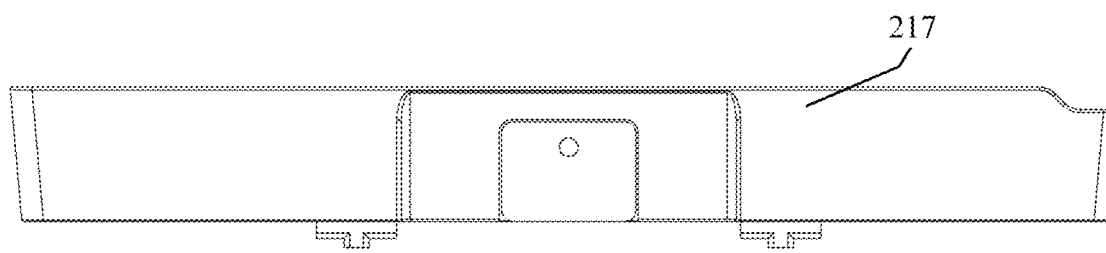
Figure 62:
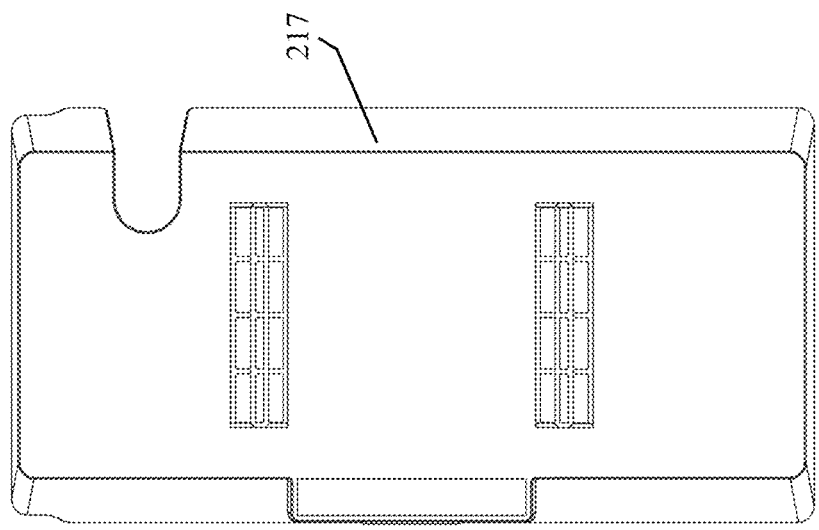
Figure 61:
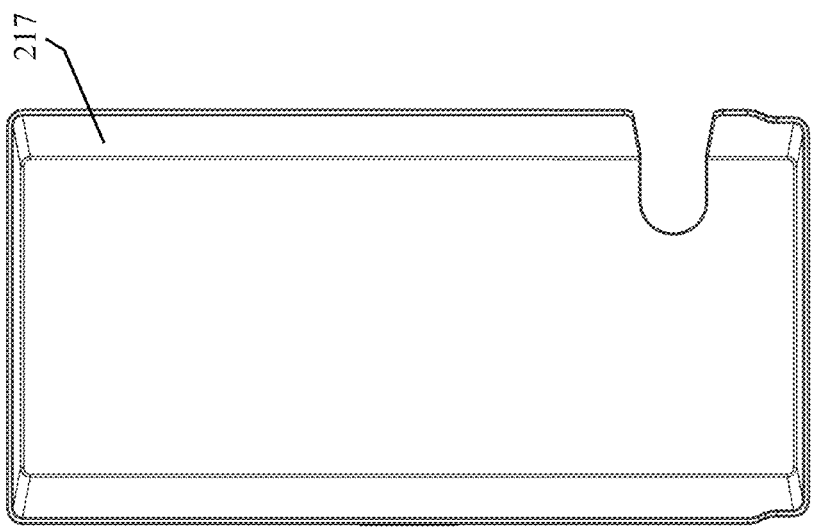

FIG. 56 is a cross-sectional view of the interface along the cross section line K-K in the front view of FIG. 55. As shown in FIG. 56, the second housing portion 340 may include a second access 455 into the second path 405, and the second cam element 395 may be positioned such that rotation of the second cam element 395 intermittently introduces the second cam element 395 into the second path 405.

The second path 405 may have a second inlet 460 positioned such that a physical request slip rejected by the retailer system 110 is fed into the second inlet 460. The second path may have a second outlet 465 positioned so as to convey physical request slips out into the rejection bin 217. The second path 405 may have a shape configured to guide a physical request slip there-through. For example, in the embodiment depicted in FIG. 56, the second path 405 has a shape defined by a second curve 470. In other embodiments, any suitable shape for the second path 405 may be used.

FIGS. 57-62 depict isometric, front, right, left, top, and bottom views, respectively, of the rejection bin 217.

Figure 63:
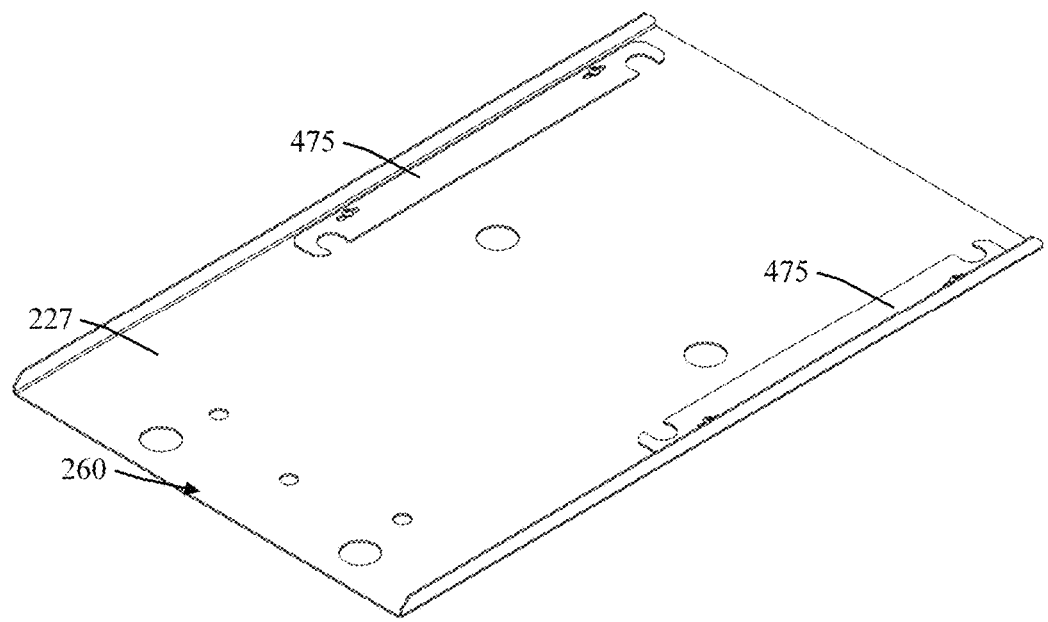
FIGS. 63-67 depict isometric, front, left, top, and bottom views, respectively, of a support plate of an automatic feeder system, according to one or more embodiments.
Figure 64:
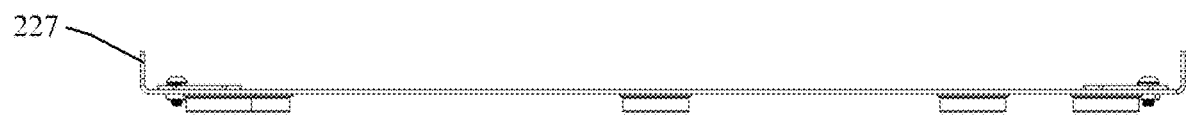
Figure 65:
Figure 67:
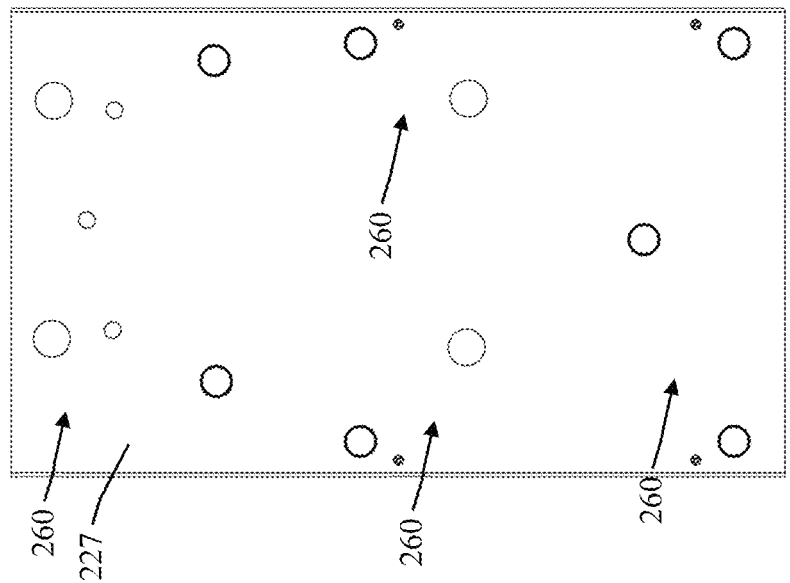
Figure 66:
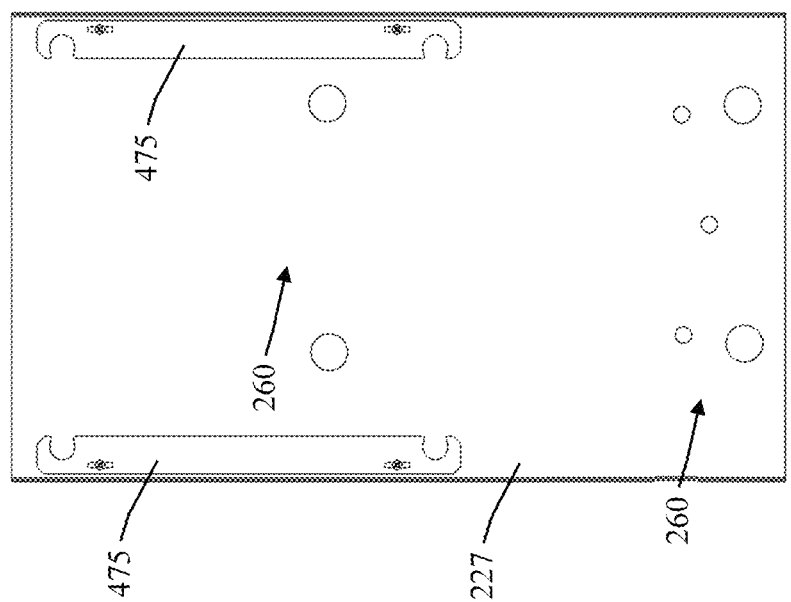

FIGS. 63-67 depict isometric, front, left, top, and bottom views, respectively, of the support plate 227. As depicted in FIG. 63, the support plate 227 may further include mounting brackets 475 configured to mount and/or locate the support frame 225 on the support plate 227.

Figure 68:
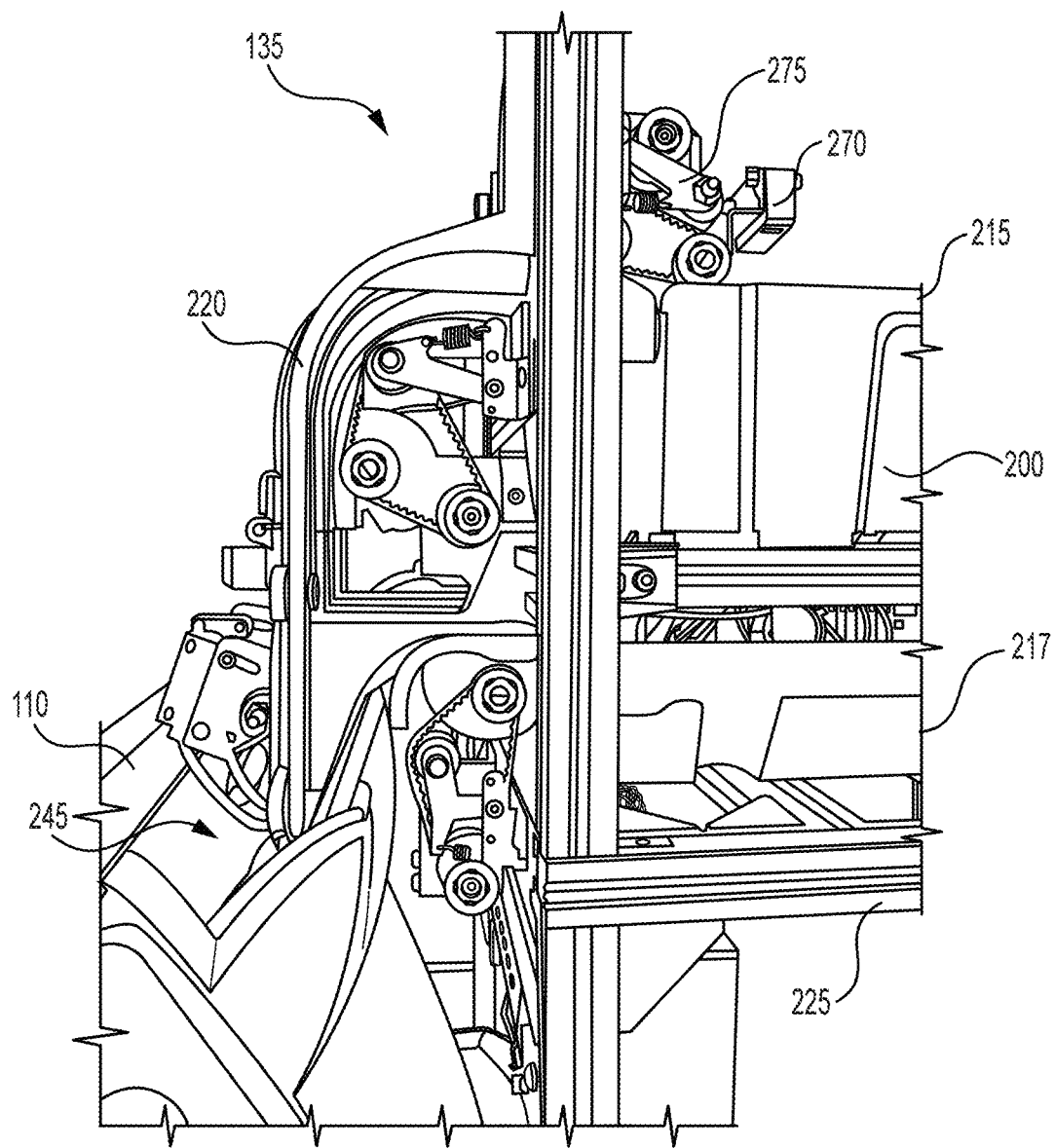
FIG. 68 depicts a right view of an exemplary embodiment of an automatic feeder system assembled with a retailer system, according to one or more embodiments.
Figure 69:
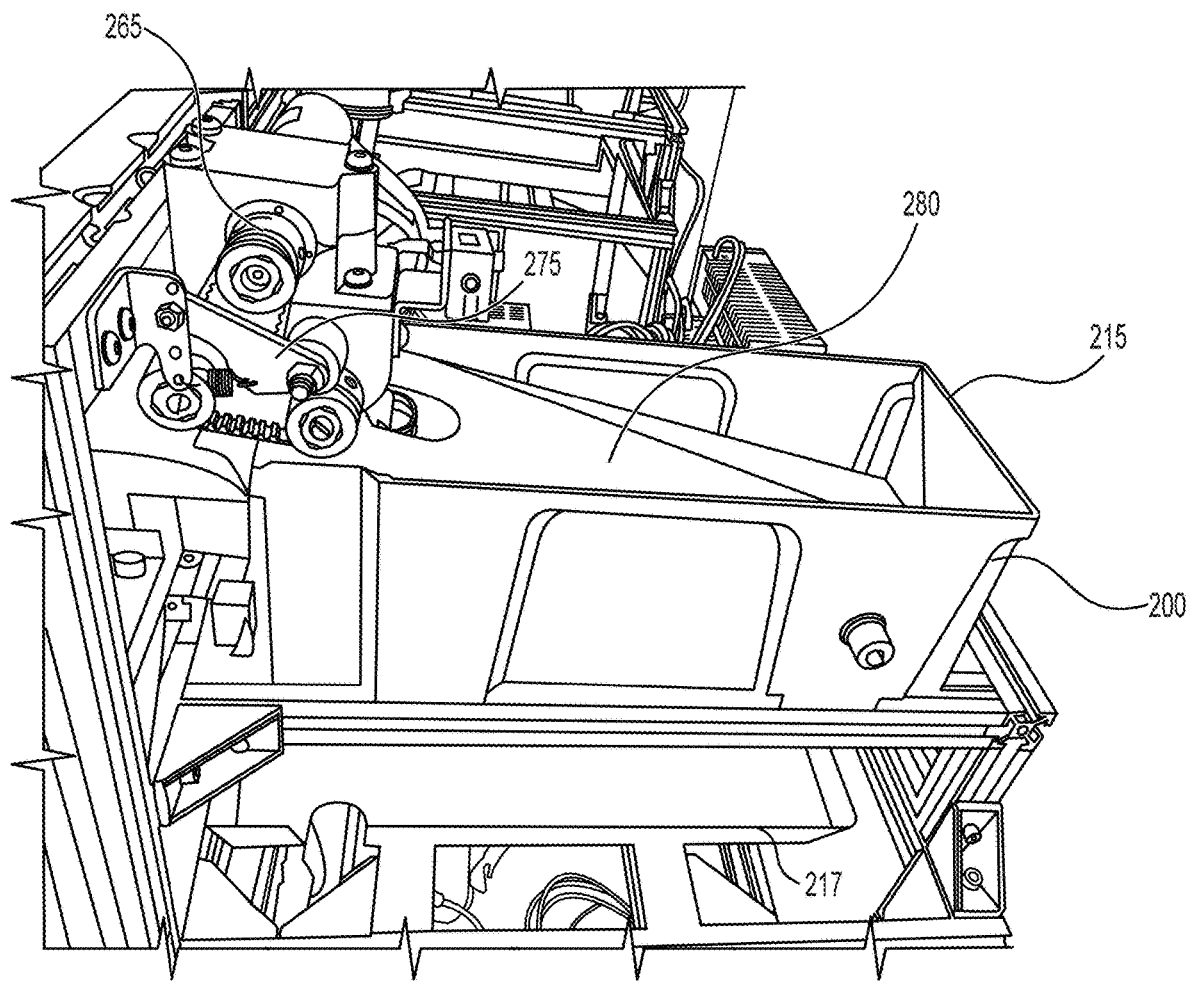
FIG. 69 depicts a right view of another exemplary embodiment of a feed unit of an automatic feeder system, according to one or more embodiments.
Figure 70:
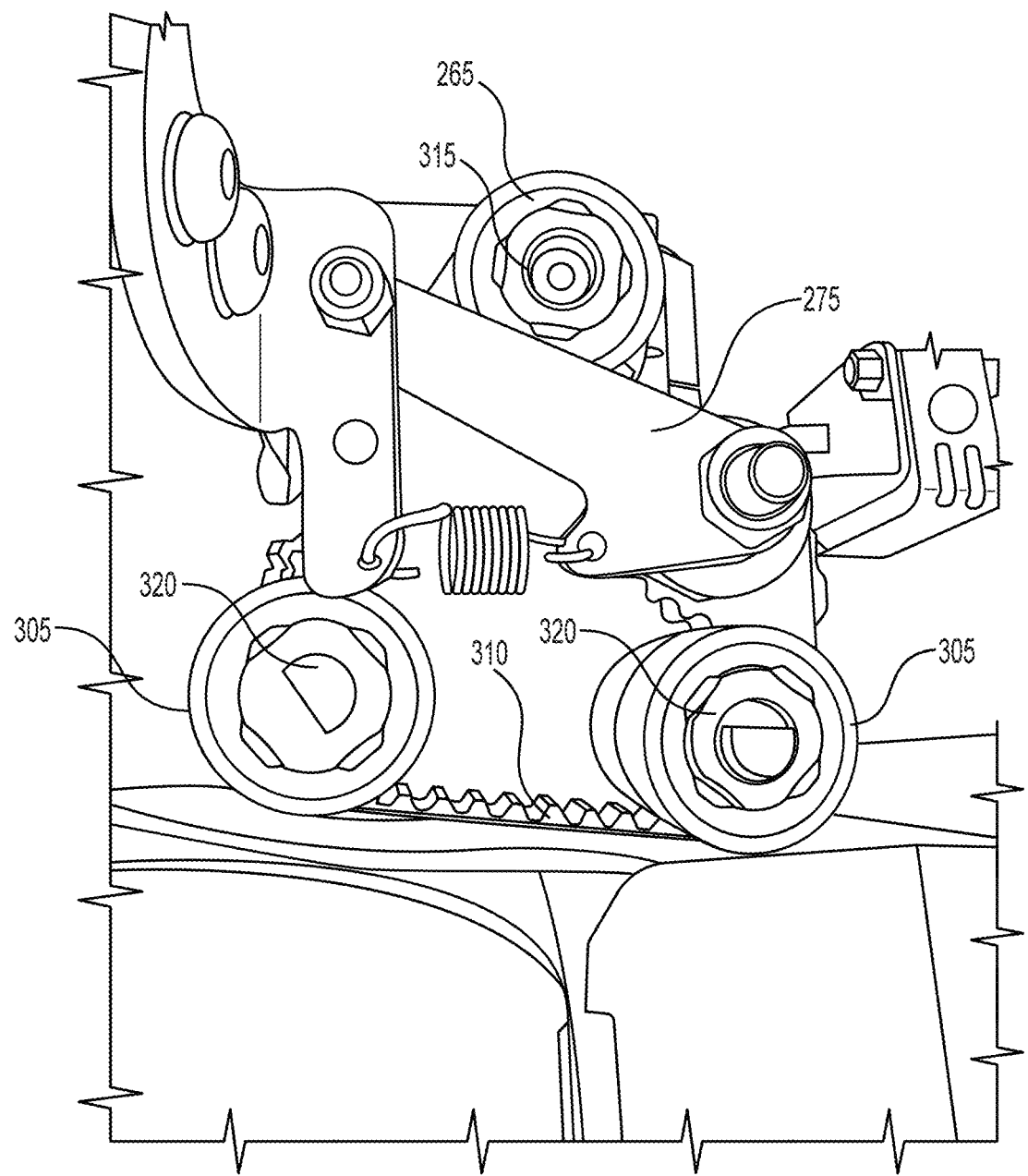
FIG. 70 depicts a right view of another exemplary embodiment of a feed belt assembly of an automatic feeder system, according to one or more embodiments.

FIG. 68 depicts a right view of the automatic feeder system 135 assembled with the retailer system 110. FIG. 69 depicts a right view of the feed unit 200. FIG. 70 depicts a right view of the feed belt assembly 275.

In the methods below, various acts are described as performed or executed by a component from FIG. 1, such as the provider server system 130, automatic feeder system 135, portion thereof, or the like. However, it should be understood that in various embodiments, various components of the computing environment 100 discussed above may execute instructions or perform acts including the acts discussed below. Further, it should be understood that in various embodiments, various steps may be added, omitted, and/or rearranged in any suitable manner.

Figure 71:
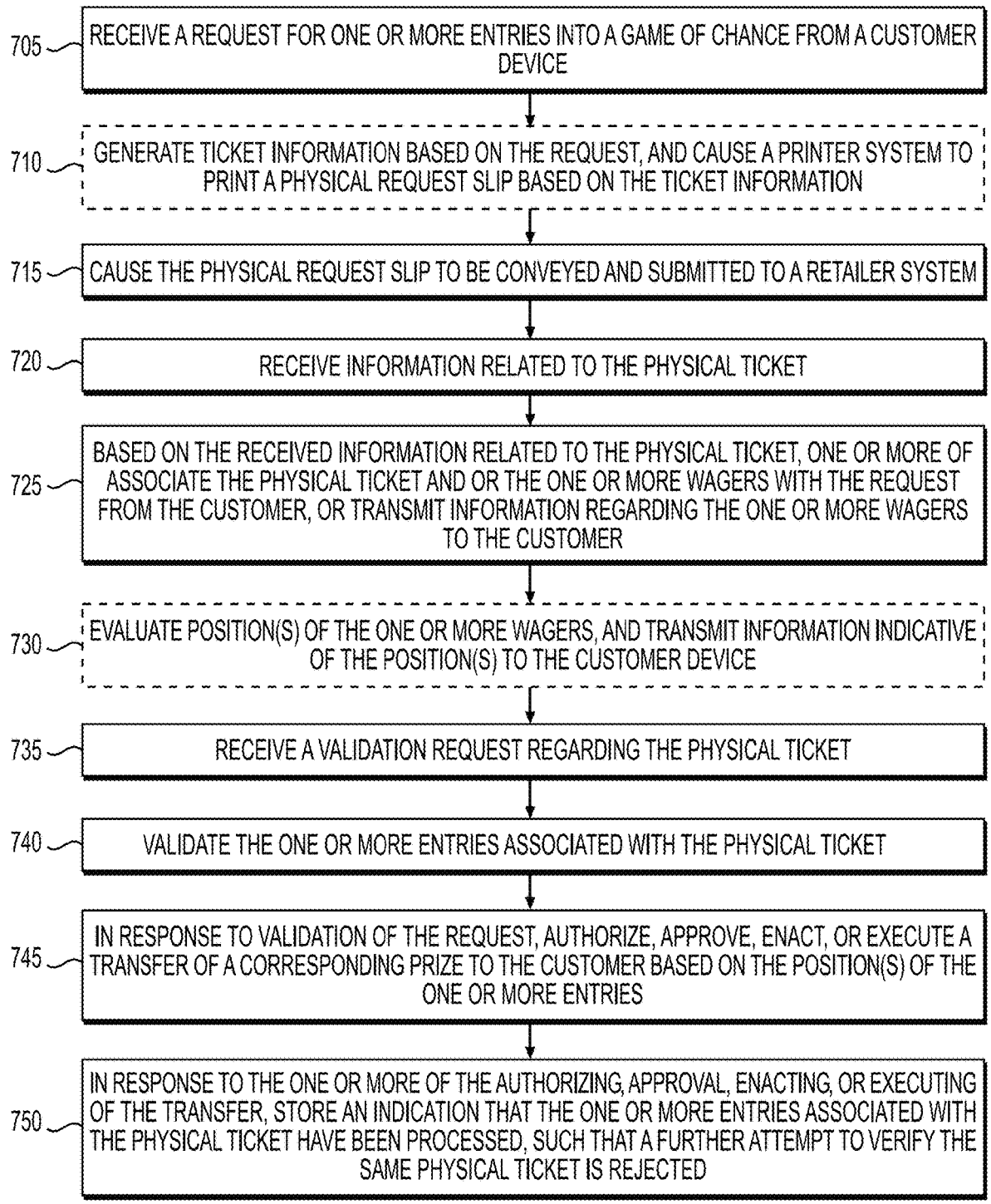
FIG. 71 depicts a flow diagram of an exemplary embodiment of a method for integrating a physical ticket into an electronic operating of a game of chance, according to one or more embodiments.

FIG. 71 illustrates an exemplary process for integrating a physical ticket into an electronic operating of a game of chance, such as in the various examples discussed above. A customer 145 may access an electronic application associated with the game of chance, e.g., via the customer device 105. Using the electronic application, the customer 145 may transmit and/or enter a request for one or more entries into the game of chance. The request may include, for example, an amount for a respective entry, a number of entries, an event to be associated with an entry, customer information, location information, authentication information, etc. The customer device 105, the customer 145 and/or the electronic application may submit the entered request to the provider server system 130, e.g., via the electronic network 125.

At step 705, the provider server system 130 may receive the request for one or more entries into the game of chance from the customer device 105. In some embodiments, the provider server system 130 may validate the request. In some embodiments, validating the request may include verifying that a location associated with the customer 145 is within an area in which play of the game of chance is authorized. For instance, play of the game of chance may be regulated and/or constrained by territorial restrictions, such that customers may only play if located within and/or residing in a particular area. In some embodiments, validating the request may include verifying a customer account associated with the customer stored on the provider server system 130, verifying customer authentication information, and/or verifying a customer financial account stored on one or more of the provider server system 130 or the financial institution system 115.

Optionally, at step 710, the provider server system 130 may generate ticket information based on the request, and cause a printer system 135 to print a physical request slip based on the ticket information. For example, in some embodiments, the provider server system 130 may arrange, format, parse, and/or edit information from the request to generate ticket information that is in a form usable to cause the printer system 133 and/or automatic feeder system 135 to generate a physical request slip that is configured to be accepted by a retailer system 110, e.g., a game terminal machine to purchase one or more entries into the game of chance.

In an exemplary use case, a retailer system 110, e.g., a game terminal machine, is configured to read a request slip that includes bubbled-in selections that define characteristics of a request. The provider server system 130 may, based on a received request, determine one or more bubbles to fill in so as to represent the characteristics of the request, and cause the printer system 133 to generate, e.g., print, a physical request slip based on the determined bubbles. While the foregoing example included the use of a fill-in-bubble form, it should be understood that any suitable type of form may be used for the physical request slip, e.g., a form that includes one or more of text, a scratch-able section, a punch card, an ink marking, or the like.

At step 715, the provider server system 130 may cause the physical request slip to be conveyed and submitted to the retailer system 110, e.g., a game terminal machine. In some embodiments, the provider may employ a retailer 150, an automatic feeder system 135, and/or an agent, e.g., a person, to convey and submit the request slip to the retailer system 110. In some embodiments, the printer system 133 and/or another system may be configured to automatically convey and submit the request slip to the retailer system 110. The retailer system 110 may be configured to generate a physical ticket for the game of chance based on the submitted physical request slip, e.g., in a manner similar to one or more of the examples discussed above, such that the physical ticket corresponds to the one or more entries requested by the customer 145.

For example, in some embodiments, the retailer system 110 may transmit a request based on the received physical request slip to the provider server system 130. In response to receiving the request, the provider server system 130 may associate each of the one or more entries of the request with a respective wager in a predetermined set of wagers. The provider server system 130 may transmit data to the retailer system 110 configured to cause the retailer system 110 to output a physical ticket that includes information related to the one or more entries and/or the associated wagers A scanner device or similar device may capture information from the physical ticket, e.g., via a scanner, camera, or the like. The provider server system 130, and/or another system may parse the captured information, e.g., via a text recognition algorithm, object recognition algorithm, or the like. Captured and/or parsed information may include information usable to uniquely identify the physical ticket, information indicative of the one or more wagers associated with the one or more entries of the customer 145's request, customer information, customer account information, authentication information, or the like. The captured information and/or the parsed information may be transmitted to the provider server system 130.

At step 720, the provider server system 130 may receive information related to the physical ticket.

At step 725, the provider server system 130 may, based on the received information related to the physical ticket, one or more of associate the physical ticket and or the one or more wagers with the request from the customer and/or corresponding request slip, and/or transmit information regarding the one or more wagers to the customer 145, e.g., via the electronic application of the customer device 105.

Optionally, at step 730, the provider server system 130 may evaluate the positon(s) of one or more wagers, and transmit information indicative of the position(s) to the customer device 105. In some embodiments, such evaluation may be performed in response to receiving a request, e.g., form the customer device 105, for an update on a position of one or more of the wagers. In some embodiments, such evaluation may be performed in response to an event. For example, the provider server system 130 may receive an update for a sporting event or other event, e.g., from the reporting system 120. In some embodiments, the transmission to the customer device 105 may include, for example, one or more of whether a position is indicative of a win or loss, a value associated with a position, an outcome of an event associated with the game of chance, or the like.

At step 735, the provider server system 130 may receive a validation request regarding the physical ticket, e.g., from the electronic application of the customer device 105. For example, the customer may, via the customer device, request validation of a physical ticket based on the information from the physical ticket transmitted to the customer device 105.

At step 740, the provider server system 130 may validate the one or more entries associated with the physical ticket.

At step 745, in response to validation of the request, the provider server system 130 may authorize, approve, enact, or execute a transfer of a corresponding prize, e.g., funds, goods, services, incentives, coupons, etc., to the customer based on the position(s) of the one or more entries. For example, in a circumstance in which the customer presented the verification request for the physical ticket via the information from the physical ticket transmitted to the customer device 105, the provider system 130 may one or more of authorize and/or execute a transfer of a payment or prize to a customer account associated with the customer 145, and/or transmit information to the financial institution system 115 configured to cause the financial institution system 115 to authorize and/or release the payment and/or price to the customer and/or an account associated with the customer.

At step 750, in response to the authorizing, approval, enacting, or executing of the transfer, the provider server system 130 may store an indication that the one or more entries associated with the physical ticket have been processed, such that a further attempt to verify the same physical ticket is rejected.

In the exemplary method above, it should be understood that, in some embodiments, the retailer 150 and/or the provider may hold the physical ticket(s) on behalf of the customer 145. For example, in some embodiments, the customer 145 may not have physical possession of the physical ticket during the execution of the method.

Figure 72:
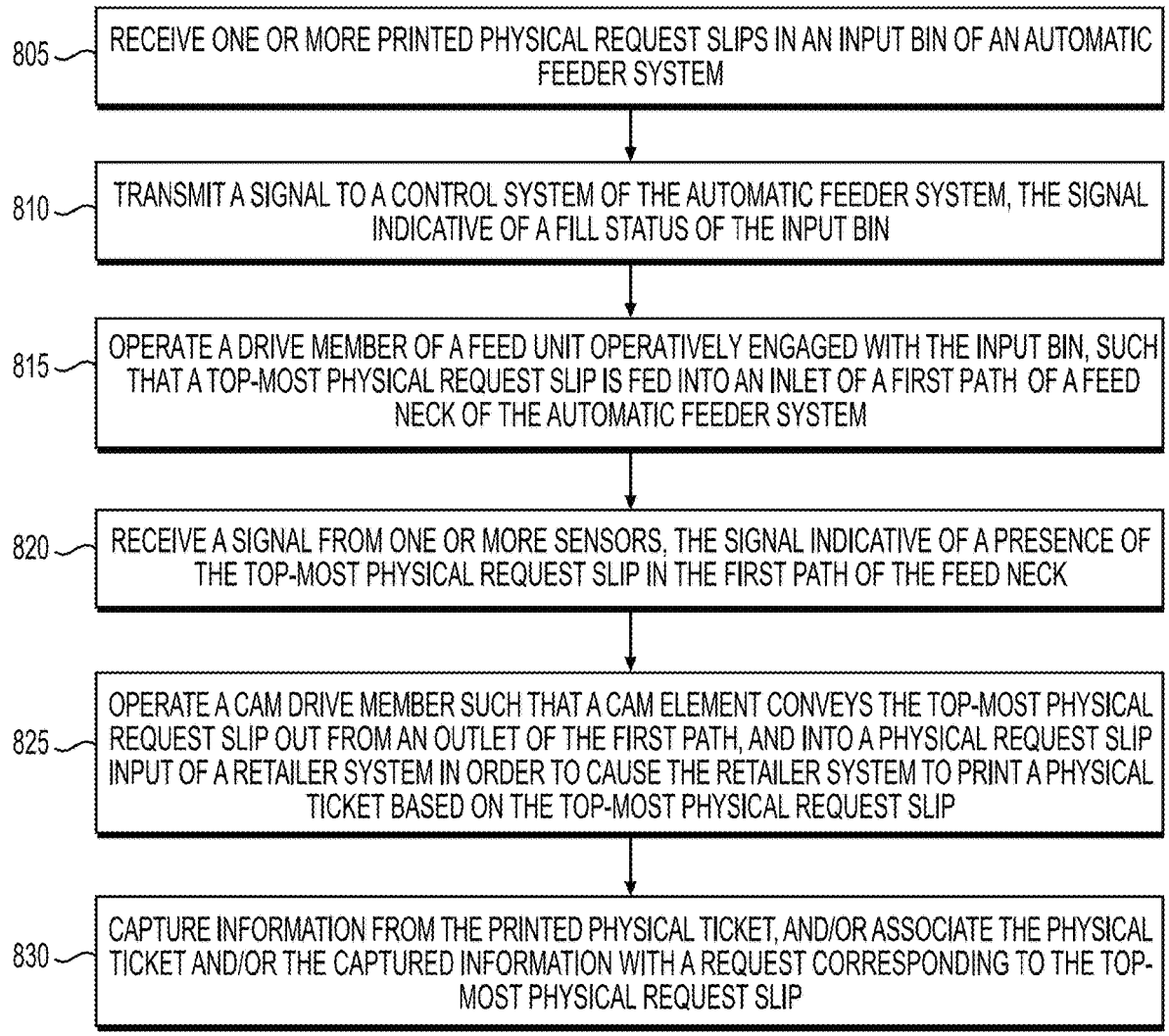
FIG. 72 depicts a flow diagram of an exemplary embodiment of a method for operating an automatic feeder system, according to one or more embodiments.

FIG. 72 depicts an exemplary embodiment for operating an automatic feeder system, such as the automatic feeder system 135 in the examples and embodiments above. A provider system 130 may receive one or more requests, e.g., one or more requests for an entry into a game of chance such as in step 705 of FIG. 71 above. The provider system may generate respective ticket information and/or cause a respective physical request slip based on the ticket information to be printed, such as in step 710 of FIG. 71 above.

At step 805, an input bin 215, e.g., of an automatic feeder system 135 may receive the one or more printed physical request slips. Receipt of the one or more physical request slips may cause the moveable tray 280 to pivot about the tray support 285. A spring 290 in the input bin 215 may bias the moveable tray 280 such that a top-most physical request slip is brought into abutment with one or more rollers 305 of a feed belt assembly 275 of a feed unit 200. In some embodiments, the input bin 215 may receive the one or more printed physical request slips when engaged with the automatic feeder system 135. In some embodiments, the input bin 215 may receive the one or more printed physical request slips when dis-engaged from the automatic feeder system 135, and then be engaged with automatic feeder system 135, e.g., in order to provide a batch of one or more printed physical request slips.

At step 810, the sensor 270 may transmit a signal, e.g., to a control system 210 of the automatic feeder system 135, that is indicative of a fill status of the input bin 215.

At step 815, the control system 210 may operate a drive member 265 e.g., to drive a drive element 315 of a feed belt assembly 275, operatively engaged with one or more rollers 305 of the feed belt assembly, such that the top-most physical request slip is fed into an inlet 410 of a first path 400 of a feed neck 220 of the automatic feeder system 135. In some embodiments, a feed element 325 of the feed unit 200 may one or more of detect the passage of the top-most physical request slip, or facilitate serial feeding of physical request slips from the input bin 215. A curve 420 of the first path 400 may guide the conveyance of the physical request slip through the feed neck 220.

At step 820, the control system 210 may receive a signal from one or more sensors 345 indicative of a presence of the physical request slip in the first path 400 of the feed neck 220.

At step 825, the control system 210 may operate a cam drive member 360 of a first roller cam assembly 350 so as to actuate a cam element 375, causing the cam element 375 to be introduce through an access 425 and into the first path 400, such that the cam element 375 advances the physical request slip out from an outlet 415 of the first path 400. The operation of the cam drive member 360 may be in response to the signal received from the one or more sensors 345. The outlet 415 may be positioned such that the physical request slip is conveyed to a physical request slip input 245 of a retailer system 110.

The retailer system 110 may print and/or operate a ticket printer 255 to print a physical ticket based on the ticket information included on the physical request slip, and may output the physical request slip from a physical request slip output 250 of the retailer system.

At step 830, a scanner device and/or another system may capture information from the printed physical ticket, and/or the provider server system may associate the physical ticket and/or the captured information with the corresponding request received by the provider system 130, such as in one or more of steps 720 and 725 in FIG. 71 above.

It should be understood that steps 805-830 in the method above may be performed multiplicatively, e.g., in order to serially convey physical request slips from the input bin 215 to the retailer system 110. In other words, in some embodiments, different physical request slips may be at different stages in the conveyance from the input bin 215 to the retailer system 110, such that one more of the steps above may be performed concurrently. It should be understood that the operation of one or more elements of the automatic feeder system, including one or more of the elements operated in the method above, may be adjusted, e.g., by the control system 210 and/or a user interacting with the interface 230 of the control system 210. For example, the control system 210 may be configured to adjust a speed and/or rate at which physical request slips are fed out from the input bin 215 and/or conveyed through the first path 400.

In some embodiments, the control system 210 may be configured to detect an interruption in the conveyance of a physical request slip, e.g., due to a jam or the like. In some embodiments, such detection may be based on one or more signals from one or more of the sensors 270, 345, etc. In some embodiments, in response to detection of an interruption, the control system 210 may be configured to one or more of activate the indicator 235, output information associated with the detected interruption via the interface 230, or pause or cease the conveyance of physical request slips. A user, in response to the indication of the interruption, may remove the removable fastener 440, open the hinge portion 430, resolve the cause for the interruption, e.g., clear the jam or the like, close the hinge portion 430, and replace the removable fastener 440. In some embodiments, the control system 210 is configured to one or more of sense, e.g., via the one or more sensors 345, whether the removable fastener 440 is in place, whether the hinge portion 430 is open or closed, etc. In some embodiments, in response to one or more of (i) sensing that the removable fastener 440 has been replaced and/or that the hinge portion 430 has been closed, a detection from the one or more sensors 345 or 270 that the interruption has been resolved, or an interaction of the user from the interface 230, the control system 210 may be configured to resume the conveyance of physical request slips.

Figure 73:
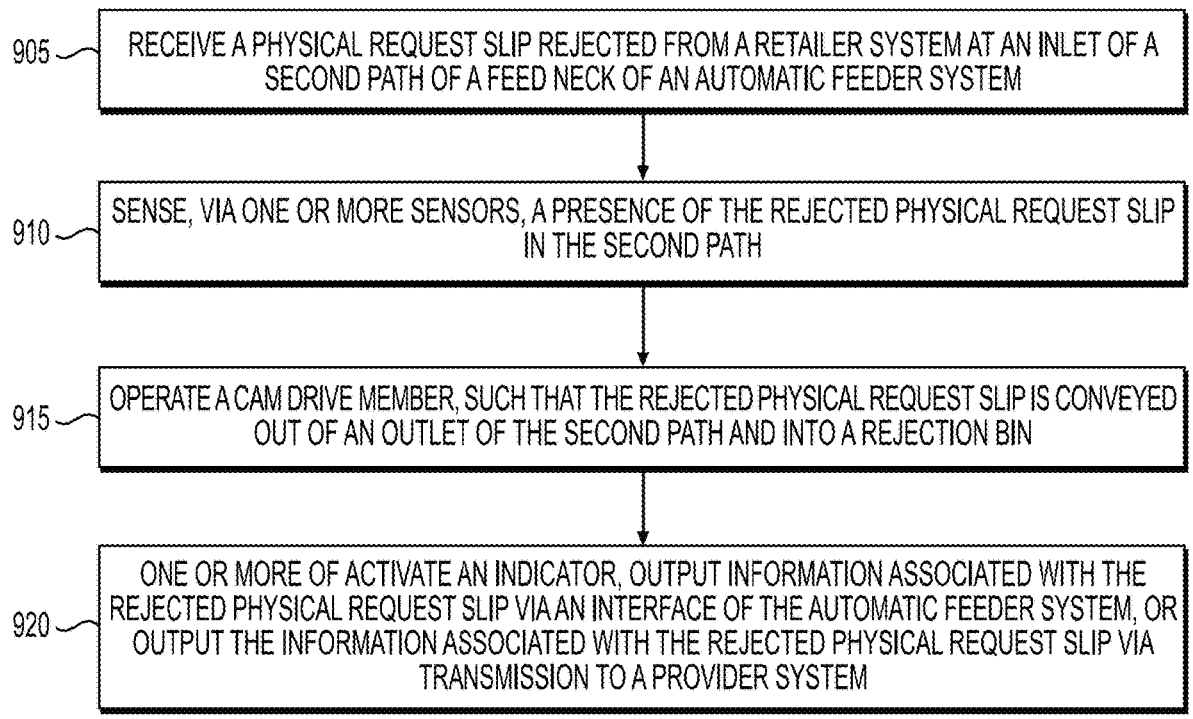
FIG. 73 depicts a flow diagram of another exemplary embodiment of a method for operating an automatic feeder system, according to one or more embodiments.

FIG. 73 depicts another exemplary embodiment for operating an automatic feeder system, such as the automatic feeder system 135 in the examples and embodiments above. A physical request slip may have been conveyed to a retailer system 110, such as via the method in FIG. 72 discussed above. The retailer system 110 may reject the physical request slip, and return the physical request slip out from the physical request slip input 245 of the retailer system 110.

At step 905 a second inlet 460 of a feed neck 220 of an automatic feeder system 135 may receive the physical request slip rejected by the retailer system 110, such that the physical request slip is introduced into a second path 405 of the feed neck 220.

At step 910, the control system 210 may sense, e.g., via one or more sensors 345, a presence of the rejected physical request slip in the second path 405.

At step 915, the control system 210 may operate a second cam drive member 390, e.g., of a second roller cam assembly 355 that is operatively engaged with a second cam element 395 configured to convey physical requests slips along the second path 405, such that the rejected physical request slip is output from a second outlet 465 of the second path 405 and into a rejection bin 217.

At step 920, the control system 210 may one or more of activate the indicator 235, output information associated with the rejected physical request slip via the interface 230, or output information associated with the rejected physical request slip via transmission to the provider system 230.

A user, e.g., from time to time, may retrieve the rejected physical request slip(s) from the rejection bin 217, may cause the re-printing of the rejected physical request slips, and/or may reintroduce the rejected physical request slips or the re-prints thereof to the input bin 215. In some embodiments, the rejection bin 217 may be dis-engaged and/or replaced with an empty rejection bin 217, e.g., to remove a batch of rejected physical request slips.

Further aspects of the disclosure are discussed in the additional embodiments below. It should be understood that embodiments in this disclosure are exemplary only, and that other embodiments may include various combinations of features from other embodiments, as well as additional or fewer features.

In an exemplary embodiment, a plurality of automatic feeder systems and a plurality of retailer systems may be assembled in a computing environment and may operate in concert with each other. In other words, physical request slips, e.g., for a game of chance, may be distributed over a plurality of automatic feeder systems that each are interfaced with a respective retailer system for the game of chance.

In general, any process or operation discussed in this disclosure that is understood to be computer-implementable, such as the process and techniques illustrated in FIGS. 71-73, may be performed by one or more processors of a computer system, such any of the systems or devices in the computing environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 74:
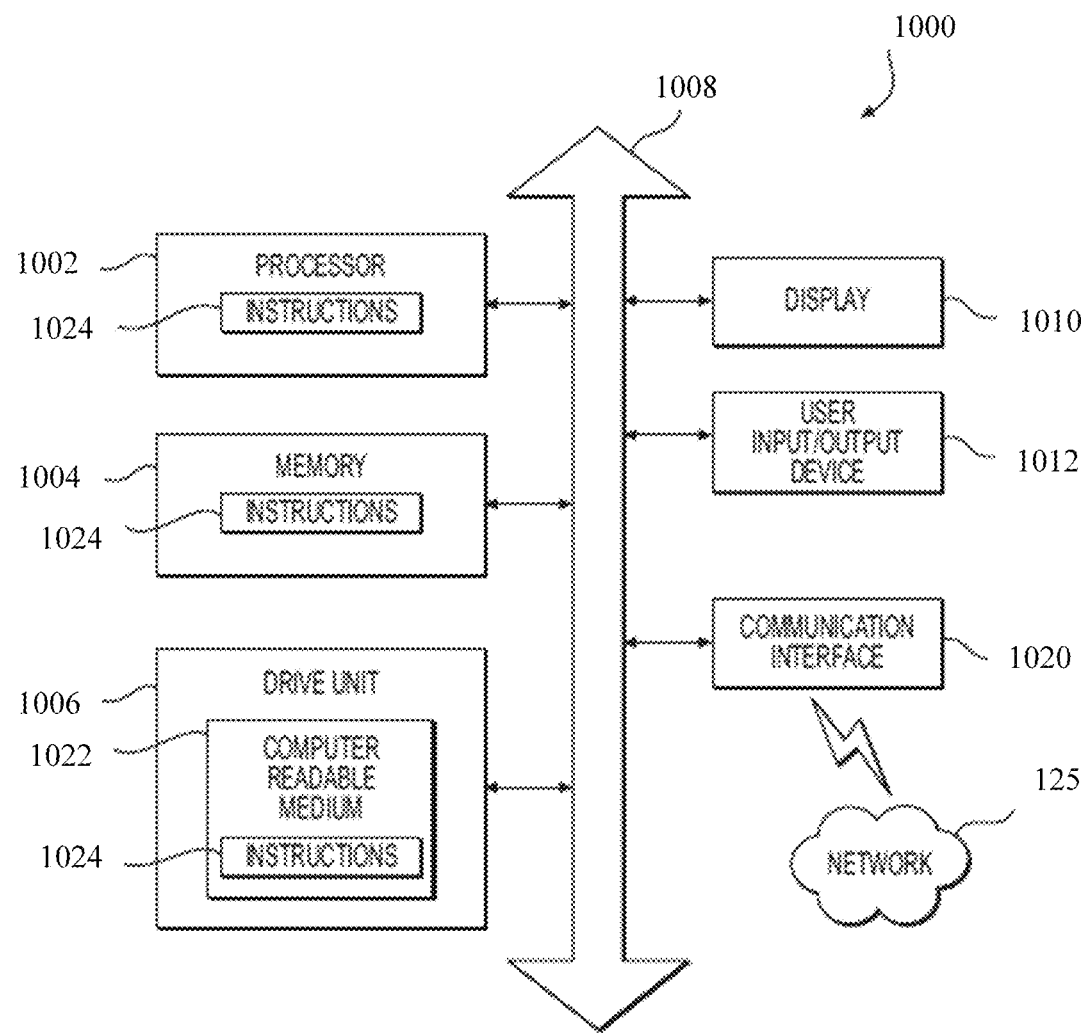
FIG. 74 depicts a functional block diagram of an exemplary embodiment of a computer, according to one or more embodiments.

FIG. 74 is a simplified functional block diagram of a computer 1000 that may be configured as a device for executing the methods of FIGS. 71-73, according to exemplary embodiments of the present disclosure. FIG. 74 is a simplified functional block diagram of a computer that may be configured as the provider server system 130, the automatic feeder system 135 or the control system 210 thereof, or the like, or combinations thereof according to exemplary embodiments of the present disclosure. In various embodiments, any of the systems herein may be an assembly of hardware including, for example, a data communication interface 1020 for packet data communication. The computer 1000 also may include a central processing unit ("CPU") 1002, in the form of one or more processors, for executing program instructions. The computer 1000 may include an internal communication bus 1008, and a storage unit 1006 (such as ROM, HDD, SDD, etc.) that may store data on a computer readable medium 1022, although the computer 1000 may receive programming and data via network communications. The computer 1000 may also have a memory 1004 (such as RAM) storing instructions 1024 for executing techniques presented herein, although the instructions 1024 may be stored temporarily or permanently within other modules of computer 1000 (e.g., processor 1002 and/or computer readable medium 1022). The computer 1000 also may include input and output ports 1012 and/or a display 1010 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those skilled in the art.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

We claim:

1. An automatic feeder system for conveying physical media, comprising:
    an input bin configured to store at least one physical media element;
    a feed neck that includes:
        a first inlet operatively connected to the input bin;
        an outlet configured to operatively connect to an input interface of a physical media device;
        a housing that defines a first path leading from the first inlet to the outlet, and that includes an access opening providing access to an interior of the first path;
    at least one actuating device that is operable to convey the physical media along the first path from the input bin to the outlet of the feed neck, the at least one actuating device including a cam element that is operable to asymmetrically rotate such that a portion of the cam element is intermittently introduced into the first path via the access opening such that the portion of the cam element directly engages with the at least one physical media element and moves the at least one physical media element along the first path; and
    a second inlet configured to operatively receive a rejected physical media, such that the rejected physical media is conveyed into a second path of the feed neck; and
    a controller that is configured to operate the at least one actuating device to non-continuously convey the physical media along the first path at a rate that is matched to an input timing of the physical media device.

2. The automatic feeder system of claim 1, further comprising:
    at least one sensor configured to track the input timing of the physical media device, wherein the controller is further configured to adjust the rate of operation for the at least one actuating device based on the input timing of the physical media device as tracked by the at least one sensor.

3. The automatic feeder system of claim 1, further comprising:
    at least one sensor configured to detect an interruption in conveyance of the physical media, wherein the controller is configured interrupt operation of the at least one actuating device in response to detecting the interruption in the conveyance of the physical media via the at least one sensor.

4. The automatic feeder system of claim 3, wherein:
    a portion of the housing that forms at least one sidewall of the first path is connected to a remainder of the housing via a hinge, such that opening the portion of the housing via the hinge provides access to an interior of the first path.

5. The automatic feeder system of claim 4, further comprising:
    a magnetic fastener configured to removably hold the portion of the housing in a closed position.

6. The automatic feeder system of claim 1, wherein:
    the first inlet of the first path is substantially horizontal; and
    the outlet of the first path is at an angle relative to the first inlet.

7. The automatic feeder system of claim 1, further comprising:
    a support frame configured to fixedly mount the automatic feeder system relative to the physical media device such that the outlet of the first path is operationally engaged with the input interface of the physical media device.

8. A method of operating an automatic feeder system for conveying physical media, comprising:
    storing one or more physical media elements in an input bin of the automatic feeder system; and
    operating, via a controller of the automatic feeder system, at least one actuating device of the automatic feeder system so as to non-continuously convey the one or more physical media elements into an inlet of a feed neck operatively connected to the input bin, along a path defined by a shape of a housing of the feed neck to an outlet of the feed neck operatively connected to an input interface of a physical media device, the path formed by inner and outer walls of the housing such that the shape of the housing is configured to guide the one or more physical media elements along the path;

wherein the controller is configured such that the at least one actuating device is operated at a rate that is matched to an input timing of the physical media device, the input timing defining non-continuous periods during which each physical media element of the one or more physical media elements are receivable into the physical media device.

9. The method of claim 8, wherein:
the housing includes an access opening that provides access to an interior of the path;
the at least one actuating device includes a cam element that is operable to asymmetrically rotate such that a portion of the cam element is intermittently introduced into the path via the access opening; and
the portion of the cam element is configured to convey the physical media along the path.

10. The method of claim 8, further comprising:
tracking, via at least one sensor, the input timing of the physical media device, wherein the controller is further configured to adjust the rate of operation for the at least one actuating device based on the input timing of the physical media device as tracked by the at least one sensor.

11. The method of claim 8, further comprising:
detecting, via at least one sensor, an interruption in conveyance of the physical media, wherein the controller is configured interrupt operation of the at least one actuating device in response to detecting the interruption in the conveyance of the physical media via the at least one sensor.

12. The method of claim 11, wherein:
a portion of the housing that forms at least one sidewall of the path is connected to a remainder of the housing via a hinge, such that opening the portion of the housing via the hinge provides access to an interior of the path.

13. The method of claim 12, wherein the portion of the housing includes a magnetic fastener configured to removably hold the portion of the housing in a closed position.

14. The method of claim 8, wherein:
the inlet of the path is substantially horizontal; and
the outlet of the path is at an angle relative to the inlet.

15. The method of claim 8, further comprising:
mounting the automatic feeder system and the physical media device via a support frame configured such that the outlet of the path is operationally engaged with the input interface of the physical media device.

16. A system, comprising:
a physical media device that includes an input interface, and that is configured to operate at an input timing; and
an automatic feeder system for conveying discrete elements of physical media, including:
an input bin configured to store the discrete elements of the physical media;
a feed neck that includes:
an inlet operatively connected to the input bin;
an outlet operatively configured to operatively connect to the input interface of the physical media device;
a housing that has a substantially curved shape, such that walls of the housing define a path leading from the inlet to the outlet; and
at least one actuating device that is operable to convey the discrete elements of the physical media along the path from the input bin to the outlet of the feed neck; and
a controller that is configured to operate the at least one actuating device to non-continuously convey the discrete elements of the physical media along the path at a rate that is matched to the input timing of the physical media device, the input timing defining non-continuous periods during which each discrete element of the discrete elements of the physical media are receivable into the physical media device.

17. The system of claim 16, further comprising:
a support frame configured to fixedly mount the automatic feeder system relative to the physical media device such that the outlet of the path is operationally engaged with the input interface of the physical media device.

18. The system of claim 16, wherein:
the housing of the automatic feeder system includes an access opening that provides access to an interior of the path; and
the at least one actuating device includes a cam element that is operable to asymmetrically rotate such that a portion of the cam element is intermittently introduced into the path via the access opening, the portion of the cam element configured to convey the physical media along the path.

19. The system of claim 16, wherein the automatic feeder system further includes:
at least one sensor configured to track the input timing of the physical media device, wherein the controller is further configured to adjust the rate of operation for the at least one actuating device based on the input timing of the physical media device as tracked by the at least one sensor.

* * * * *